(12) United States Patent
Silha et al.

(10) Patent No.: US 11,715,862 B2
(45) Date of Patent: Aug. 1, 2023

(54) BATTERY PACK

(71) Applicant: MILWAUKEE ELECTRIC TOOL CORPORATION, Brookfield, WI (US)

(72) Inventors: Wyatt R. Silha, Milwaukee, WI (US); John G. Marx, Hartford, WI (US); Zachery Meyer, Hartland, WI (US); David M. Schwalbach, Milwaukee, WI (US); Joel D. Snyder, Milwaukee, WI (US); Francis X. Summins, Milwaukee, WI (US); Cameron R. Schulz, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 17/814,157

(22) Filed: Jul. 21, 2022

(65) Prior Publication Data

US 2023/0026217 A1    Jan. 26, 2023

Related U.S. Application Data

(60) Provisional application No. 63/224,175, filed on Jul. 21, 2021.

(51) Int. Cl.
| | |
|---|---|
| *H01M 50/375* | (2021.01) |
| *H01M 10/48* | (2006.01) |
| *H01M 50/296* | (2021.01) |
| *H01M 50/284* | (2021.01) |

(52) U.S. Cl.
CPC ....... *H01M 50/375* (2021.01); *H01M 10/486* (2013.01); *H01M 50/284* (2021.01); *H01M 50/296* (2021.01); *H01M 2220/30* (2013.01)

(58) Field of Classification Search
None
See application file for complete search history.

(56) References Cited

U.S. PATENT DOCUMENTS

| | | |
|---|---|---|
| 10,090,498 B2 | 10/2018 | Olsson et al. |
| 2010/0221590 A1 | 9/2010 | Reber |
| 2016/0240901 A1* | 8/2016 | Kondo ............. H01M 10/6235 |
| 2019/0027720 A1 | 1/2019 | Rejman et al. |
| 2020/0259135 A1 | 8/2020 | Lee et al. |

OTHER PUBLICATIONS

International Search Report and Written Opinion for Application No. PCT/US2022/074023 dated Nov. 11, 2022 (8 pages).

* cited by examiner

*Primary Examiner* — Wyatt P McConnell
(74) *Attorney, Agent, or Firm* — Michael Best & Friedrich LLP

(57) ABSTRACT

A battery pack including a housing having a first portion and a second portion coupled to the first portion. The first portion has a first wall and an interface extends from the first wall. The interface includes a plurality of terminal apertures that provide access to electrical terminals within the housing. The second portion has a second wall, and the second wall is positioned opposite the first wall. A first plurality of vents extends through the first wall and a second plurality of vents extends through the second wall. A cumulative surface area of the first plurality of vents is different than a cumulative surface area of the second plurality of vents.

21 Claims, 22 Drawing Sheets

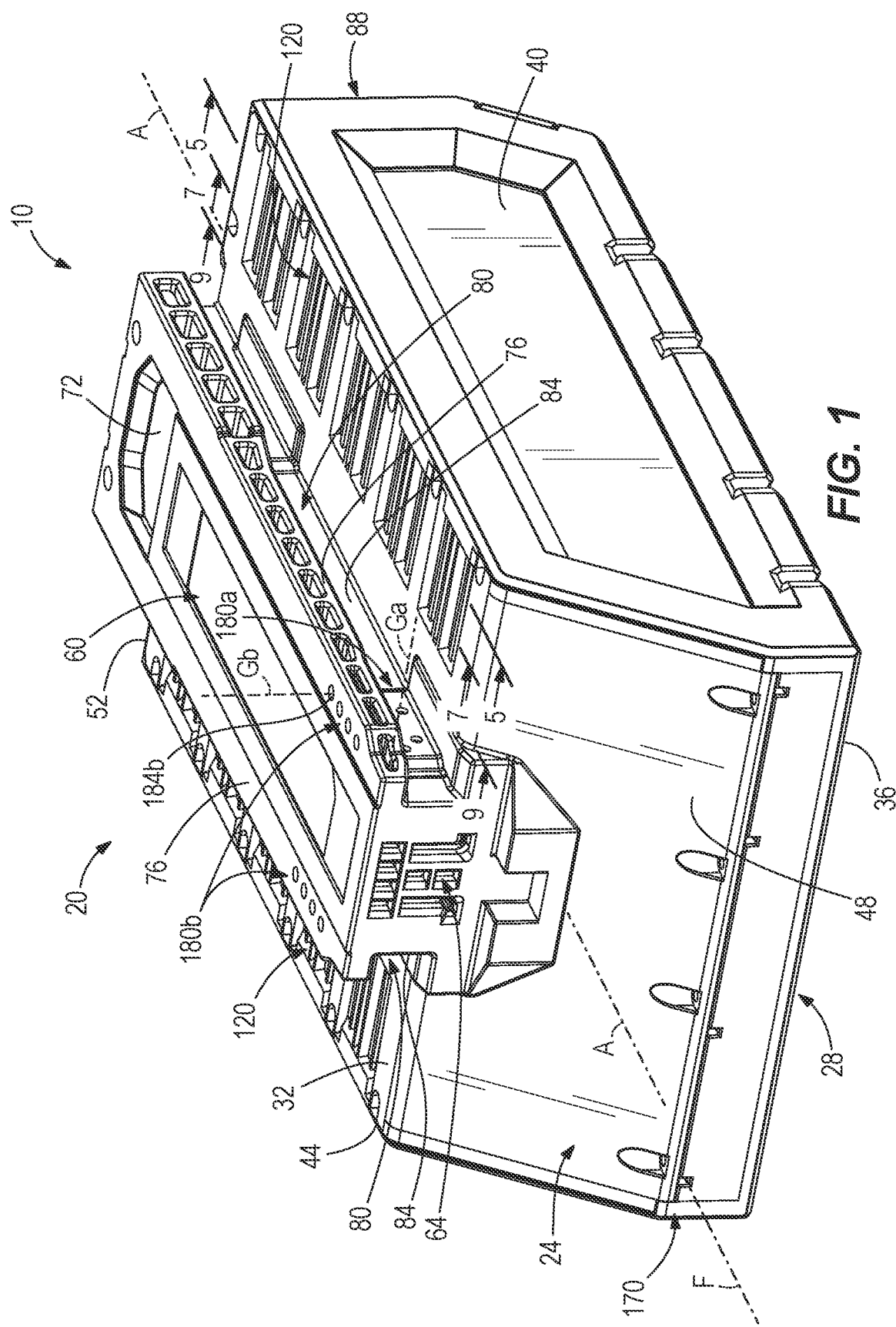

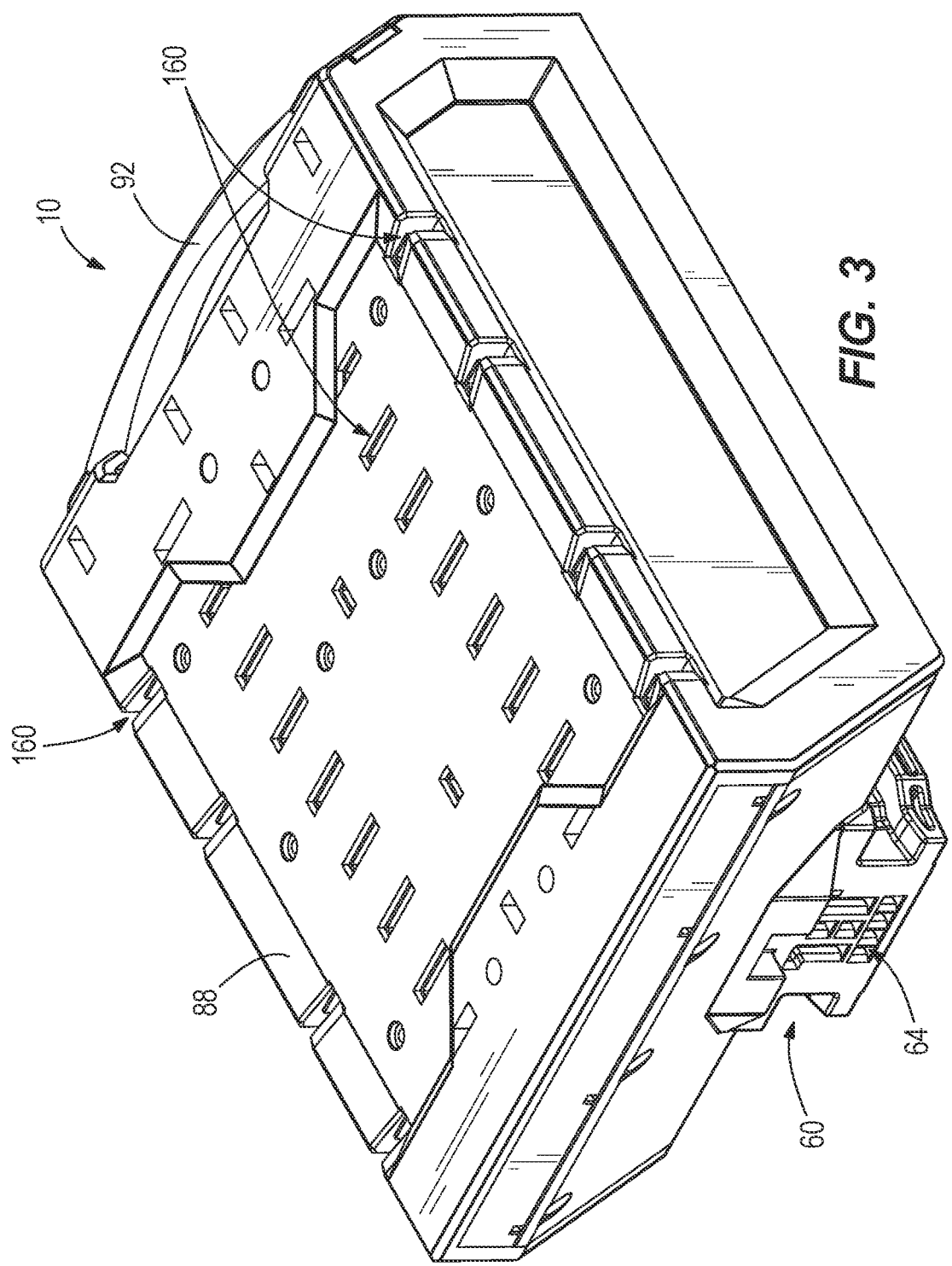

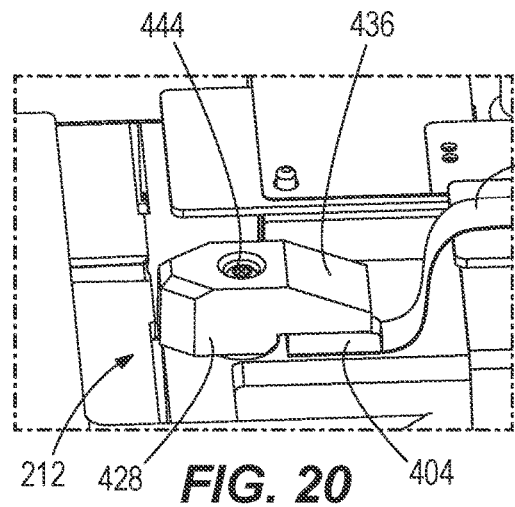
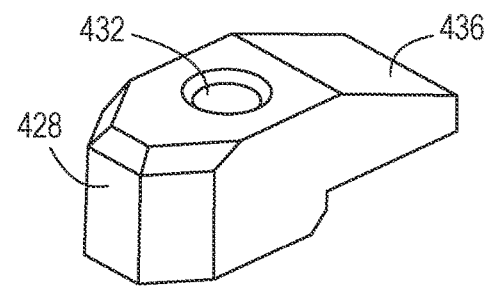
FIG. 19
FIG. 20
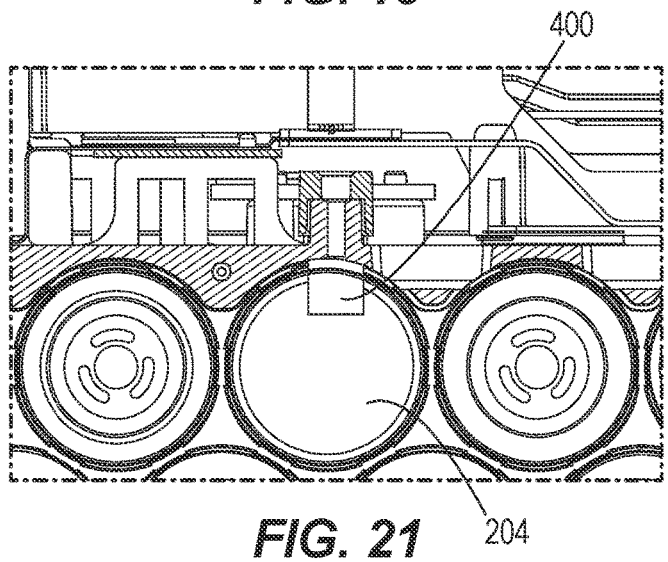
FIG. 21
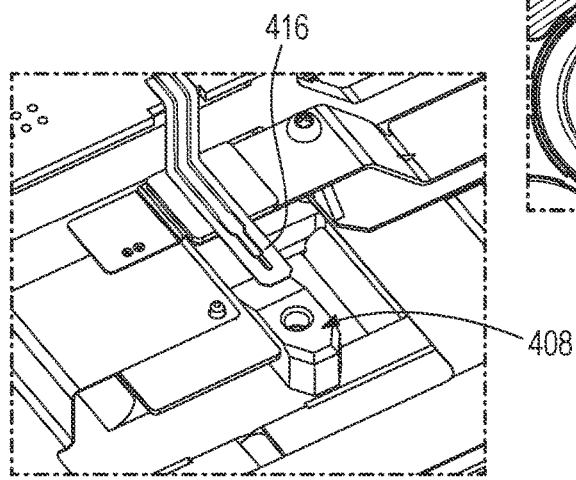
FIG. 22A
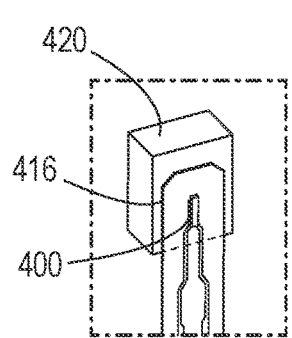
FIG. 22B
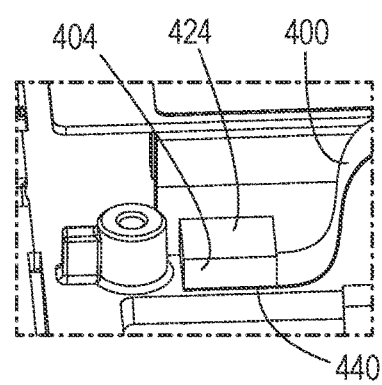
FIG. 22C
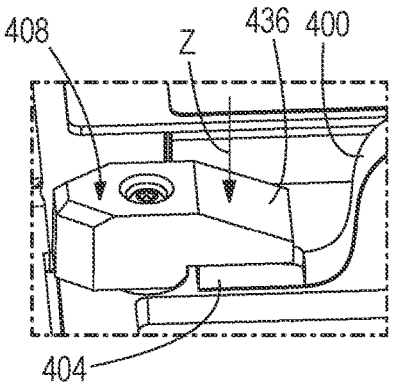
FIG. 22D

BATTERY PACK

CROSS-REFERENCE TO RELATED APPLICATIONS

This application claims priority to U.S. Provisional Patent Application No. 63/224,175, filed Jul. 21, 2021, the entire contents of each of which are incorporated by reference herein.

FIELD

This present disclosure relates to a battery pack.

SUMMARY

In one aspect, the disclosure provides battery pack including a housing having a first portion and a second portion coupled to the first portion. The first portion has a first wall and an interface extends from the first wall. The interface includes a plurality of terminal apertures that provide access to electrical terminals within the housing. The second portion has a second wall, and the second wall is positioned opposite the first wall. A first plurality of vents extends through the first wall and a second plurality of vents extends through the second wall. A cumulative surface area of the first plurality of vents is different than a cumulative surface area of the second plurality of vents.

In another aspect, the disclosure provides a battery pack including a housing including an interface, and a battery cell holder enclosed within the housing. The battery cell holder is configured to receive and secure a plurality of battery cells and includes an aperture extending therethrough and providing access to at least one of the plurality of battery cells. The battery pack also has battery pack circuitry supported by the battery cell holder, and a temperature measuring assembly supported by the battery cell holder and in electrical communication with the battery pack circuitry to measure the temperature of the at least one of the plurality of battery cells. The temperature measuring assembly includes a sensor having a first end in electrical communication with the battery pack circuitry and a second end extending through the aperture in the battery cell holder. The second end is configured to directly contact the at least one of the plurality of battery cells. A pressing member is at least partially positioned with the aperture and is configured to press the second end of the sensor against the at least one of the plurality of battery cells. A clamp is secured to the battery cell holder and configured to secure the pressing member relative to the battery cell holder such that the pressing member forces the second end of the sensor to maintain contact with the at least one of the plurality of battery cells.

In another aspect, the disclosure provides a battery pack including a housing having a first portion and a second portion coupled to the first portion. The first portion has a first wall and an interface extending from the first wall. The interface includes a plurality of terminal apertures that provide access to electrical terminals within the housing. The second portion has a second wall, and the second wall is positioned opposite the first wall. A first plurality of housing vents extends through the first wall, and a second plurality of housing vents extends through the second wall. A battery cell holder is enclosed within the housing and configured to receive and secure a plurality of battery cells. The battery cell holder includes a first wall and a second wall opposite the first wall. The first wall of the battery cell holder is positioned adjacent the first wall of the housing and the second wall of the battery cell holder positioned adjacent the second wall of the housing. At least one of the first wall and the second wall of the battery cell holder includes a plurality of battery cell holder vents positioned adjacent to one or more of the respective first plurality of housing vents or second plurality of housing vents.

BRIEF DESCRIPTION OF THE DRAWINGS

FIG. 1 is perspective view of a battery pack according to one construction.

FIG. 3 is another perspective view of the battery pack of FIG. 1.

FIG. 19 is a perspective view of clamp of the cell temperature measuring assembly.

FIG. 20 is a perspective view of the cell temperature measuring assembly.

FIG. 21 is a schematic view of a portion of the battery pack of FIG. 1 and the cell temperature measuring assembly.

FIG. 22A illustrates a step of assembling the cell temperature measuring assembly.

FIG. 22B illustrates a step of assembling the cell temperature measuring assembly.

FIG. 22C illustrates a step of assembling the cell temperature measuring assembly.

FIG. 22D illustrates a step of assembling the cell temperature measuring assembly.

DETAILED DESCRIPTION

Figure 2A:
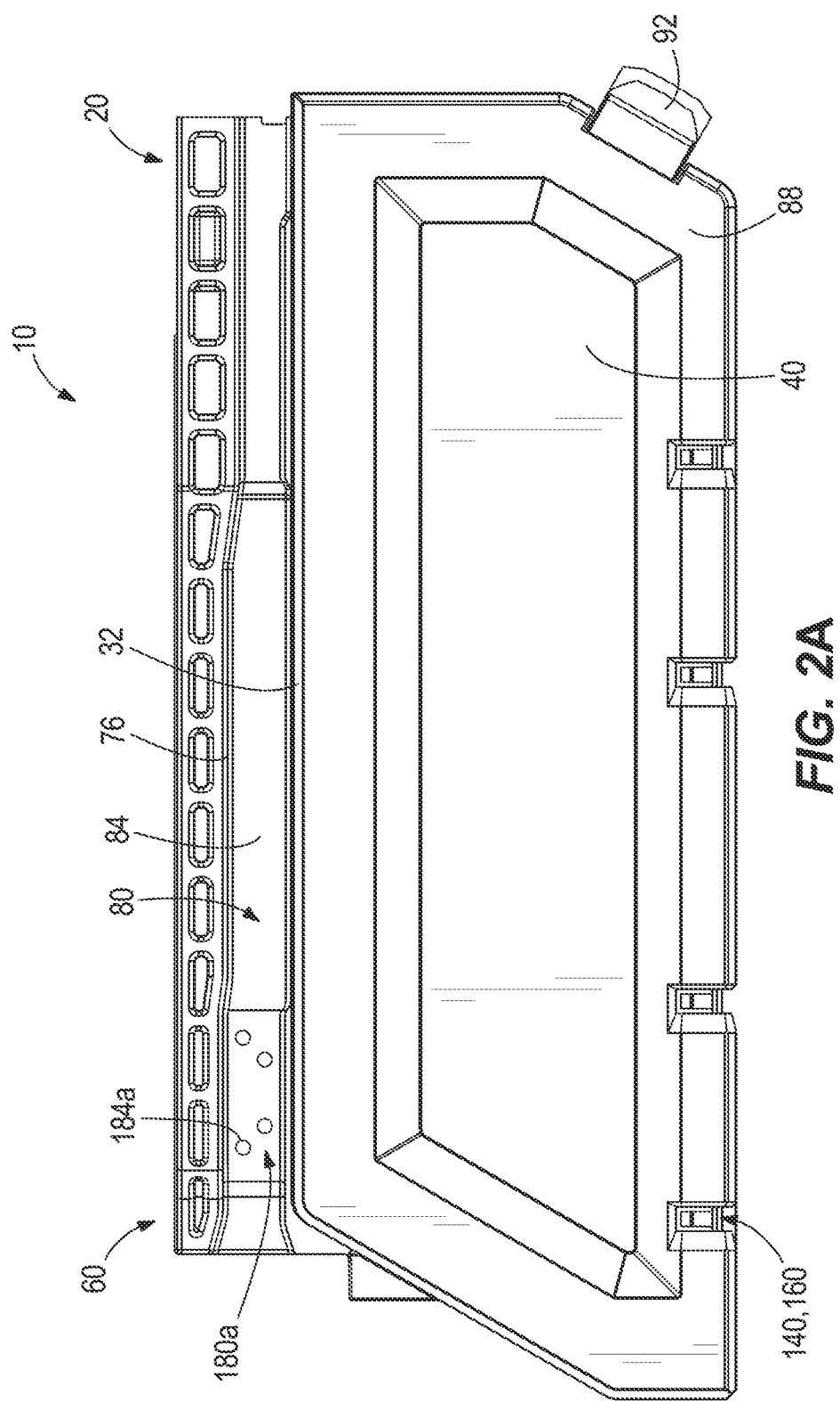
FIG. 2A is a side view of the battery pack of FIG. 1.

Before any independent constructions of the present disclosure are explained in detail, it is to be understood that the present disclosure is not limited in its application to the details of construction and the arrangement of components set forth in the following description or illustrated in the following drawings. The present disclosure is capable of other independent constructions and of being practiced or of being carried out in various ways.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof.

As shown in FIGS. 1-4, the battery pack 10 may include a battery pack housing 20 including a longitudinal axis A, a first portion 24, and a second portion 28 that are coupled to the first portion 24. The battery pack housing 20 includes a first wall 32, a second wall 36 opposite the first wall 32, a first sidewall 40, a second sidewall 44 opposite the first sidewall 40, a third sidewall 48, and a fourth sidewall 52 opposite the third sidewall 48. The sidewalls 40, 44, 48, 52 couple the first wall 32 and the second wall 36. In the illustrated embodiment, the third sidewall 48 is a front wall and the fourth sidewall 52 is a rear wall.

With reference to FIG. 1, a battery pack interface 60 projects from the first wall 32. The battery pack interface 60 is receivable within a battery pack receptacle (not shown) of a power tool or a charger. The battery pack interface 60 includes a plurality of terminal apertures 64 (e.g., openings) extending therethrough that allow access to electrical terminals 68 (FIG. 15) positioned within the battery pack housing 20. The plurality of terminal apertures 64 is positioned adjacent the front wall 48 of the battery pack housing 20. The battery pack interface 60 further includes a latch-receiving recess 72. In the illustrated embodiment, the latch-receiving recess 72 is adjacent the rear wall 52 of the battery pack housing 20. On opposite sides of the battery pack interface 60 are rails 76 and grooves 80 that are defined between the respective rail 76 and the first wall 32. Each groove 80 is at least partially defined by a groove wall 84 that extends between the respective rail 76 and the first wall 32. The rails 76 and grooves 80 extend parallel to the longitudinal axis A from the front wall 48 the rear wall 52.

With continued reference to FIG. 1., in the illustrated embodiment, the first wall 32, a portion of the front wall 48, and the battery pack interface 60 make up the first portion 24, and the second wall 36, the first sidewall 40, the second sidewall 44, a portion of the front wall 48, and the rear wall 52 make up the second portion 28. The first and second portions 24, 28 are coupled to one another by fasteners, for example. In other embodiments, other combinations of the walls may make up the respective first and second portions 24, 28. In still other embodiments, the entire battery pack housing 20 may be integrally formed as a single piece. The battery pack housing 20 may be constructed from any suitable material, such as plastic. In the illustrated embodiment, a protective member 88 is coupled to the battery pack housing 20. The protective member 88 may be formed from an elastomeric material or other suitable shock absorbing material. A handle 92 (FIG. 2A) extends from the rear wall 52.

With respect to FIGS. 1, 5-8, and 11-12, the first wall 32 includes a plurality of recesses 100 (FIGS. 6, 8, 12) positioned on opposite sides of the battery pack interface 60. With specific reference to FIGS. 6 and 8, each of the recesses 100 defines a recessed wall 104 and is separated from the adjacent recesses 100 by a partition wall 108. One or more openings 112 extend through the partition walls 108. Each of the openings 112 are oriented along an axis B (FIG. 8) that is parallel to the longitudinal axis A. The openings 112 in the partition walls may be aligned with or staggered relative to the openings 112 of adjacent partition walls. For example, in some instances the partition walls 108 have openings 112 (e.g., two openings) that are aligned with the openings 112 (e.g., the two openings) of an adjacent partition wall 108. In some instances, the partition wall 108 includes openings 112 (e.g., three openings) that are staggered relative to the openings 112 (e.g., two openings) of an adjacent partition wall 108. In some instances the partition walls 108 may have a single opening 112. The openings 112 in the partition walls 108 define a first plurality of vents 120 that allow fluid communication between an exterior of the battery pack housing 20 and the interior of the battery pack housing 20. The recessed walls 104 and partition walls 108 define air flow guide members (e.g., louvers). The louvers direct airflow and create a labyrinth for fluid ingress protection, solid ingress protection (e.g., against nails, saw dust, etc.), or both.

Figure 4:
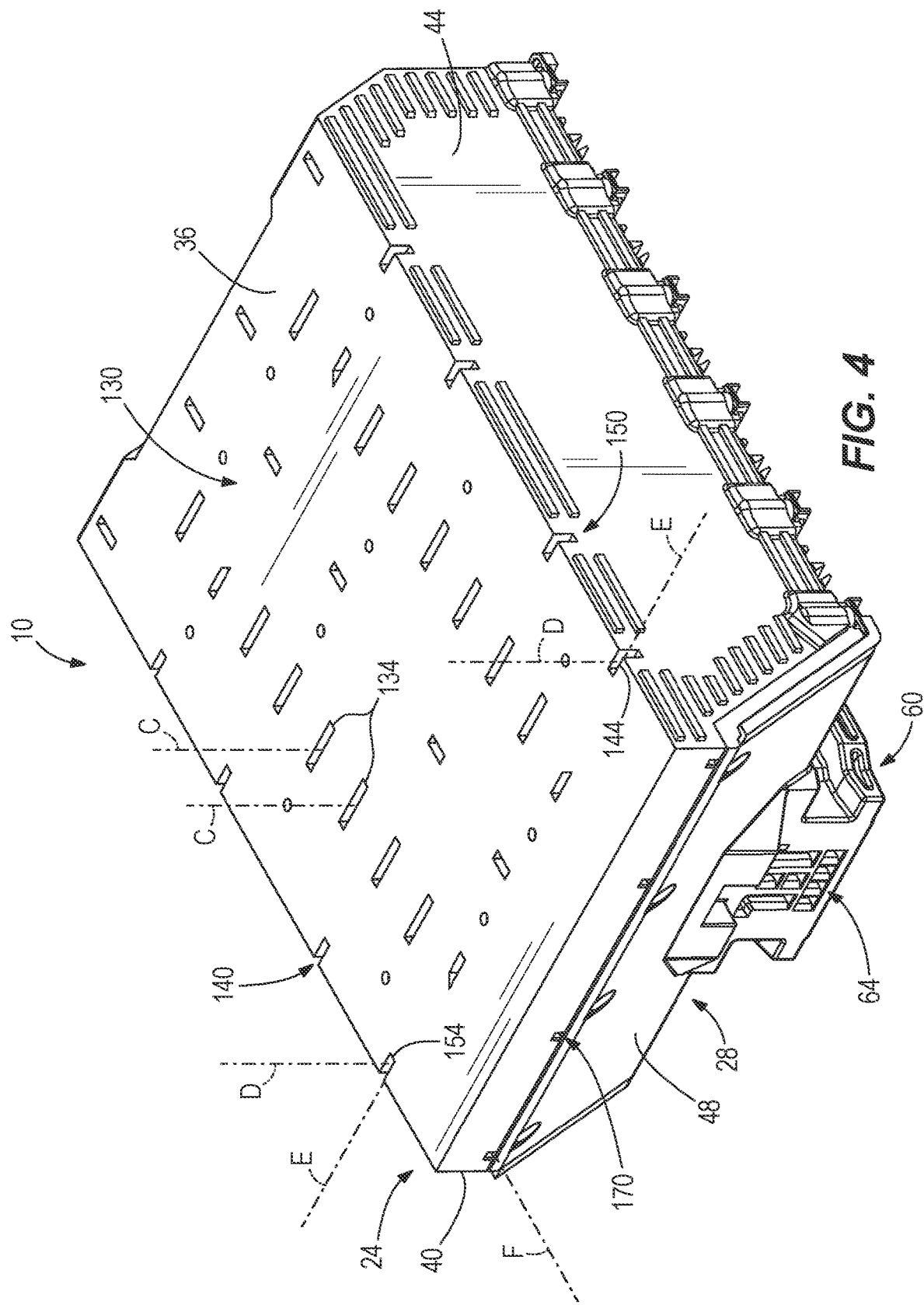
FIG. 4 is another perspective view of the battery pack of FIG. 1.
Figure 5:
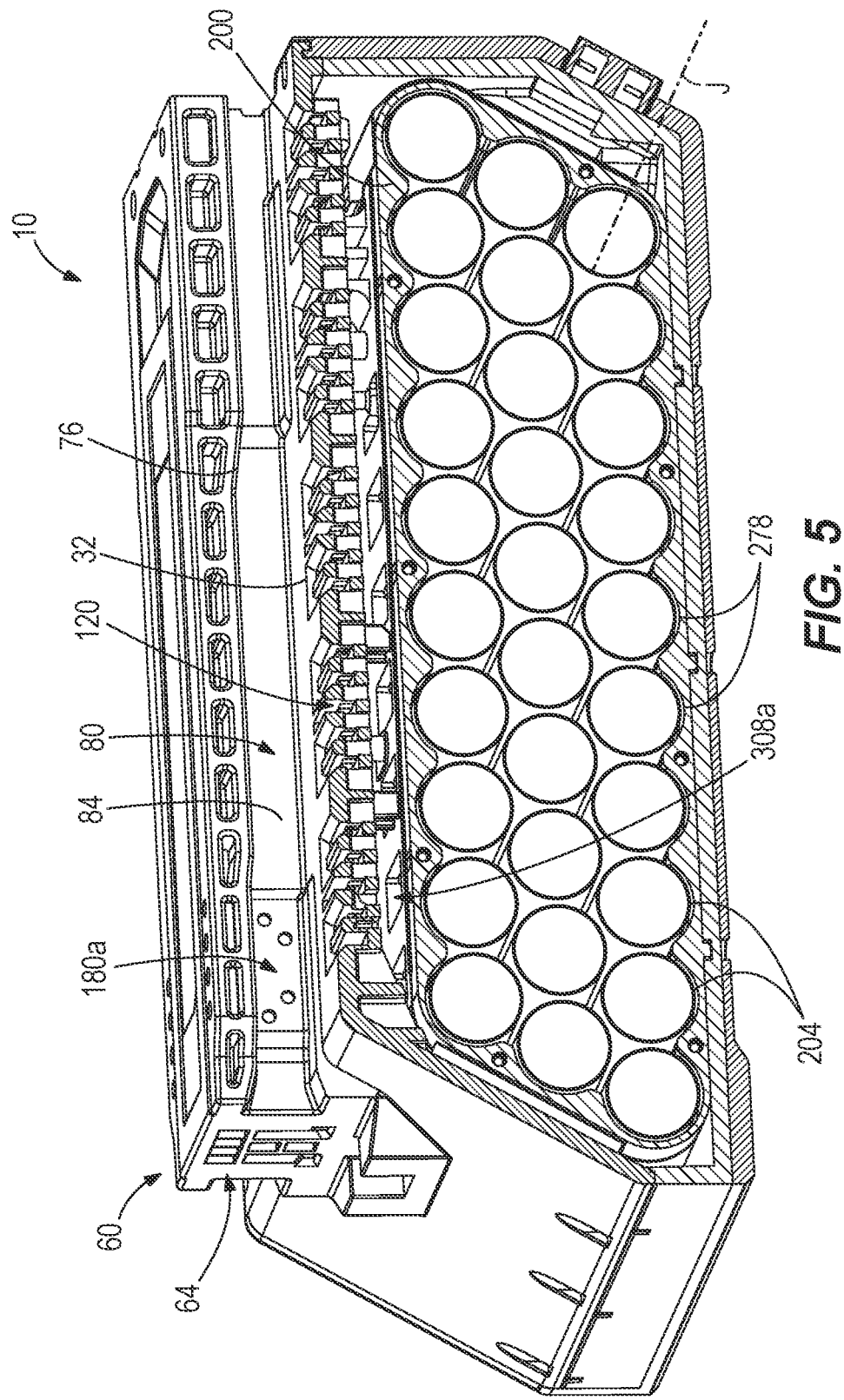
FIG. 5 is cross-sectional view of the battery pack of FIG. 1 along the line 5-5 of FIG. 1.
Figure 6:
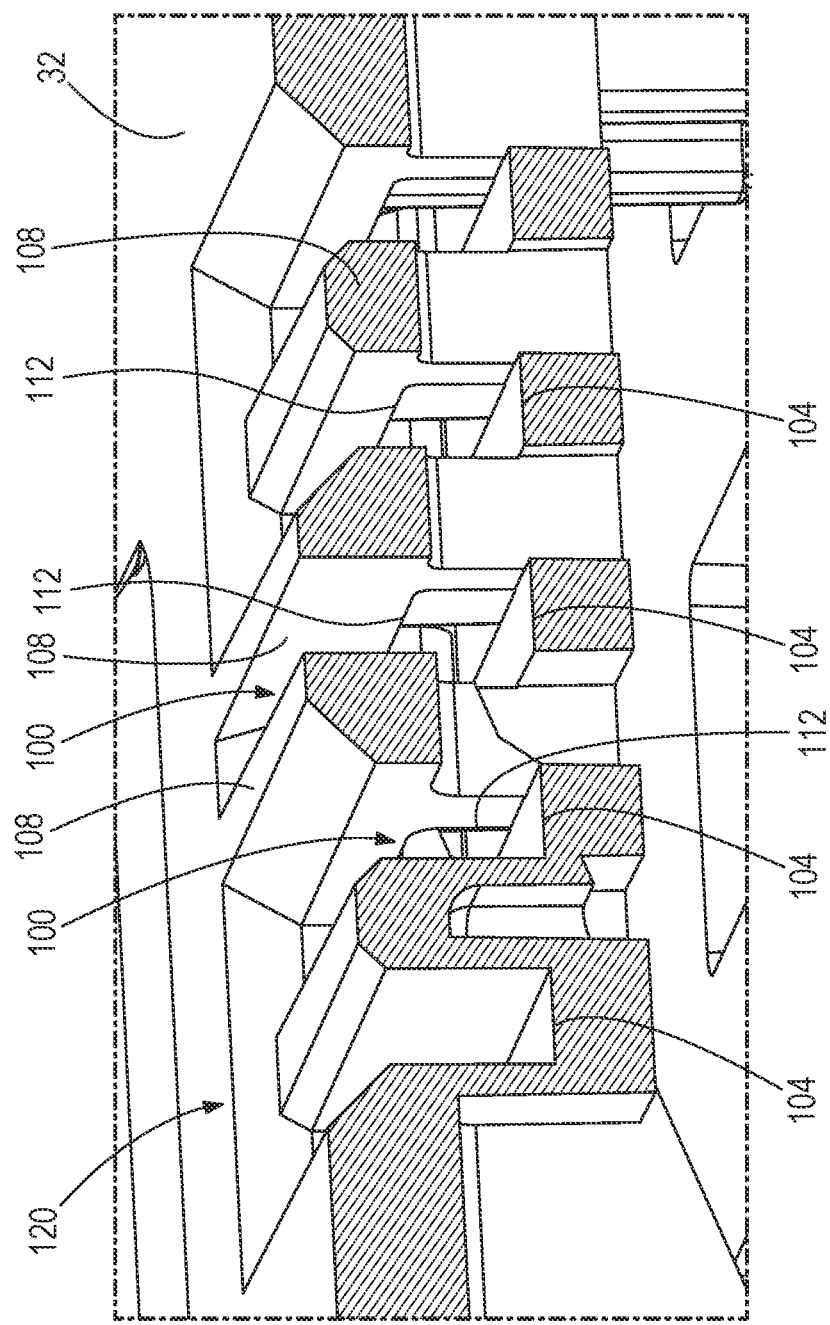
FIG. 6 is a detailed view of a portion of FIG. 5.
Figure 7:
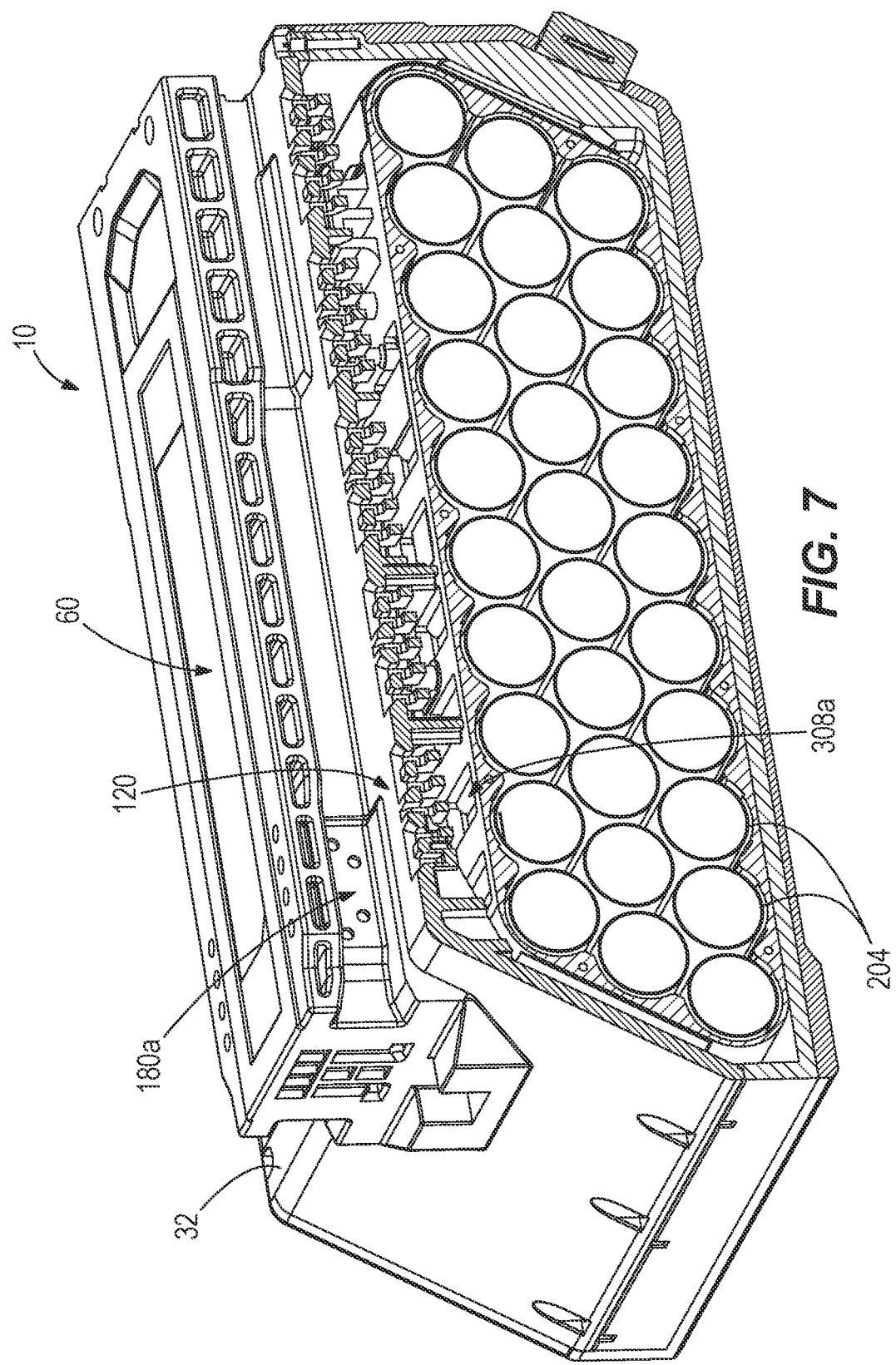
FIG. 7 is a cross-sectional view of the battery pack of FIG. 1 along the line 7-7 of FIG. 1.
Figure 8:
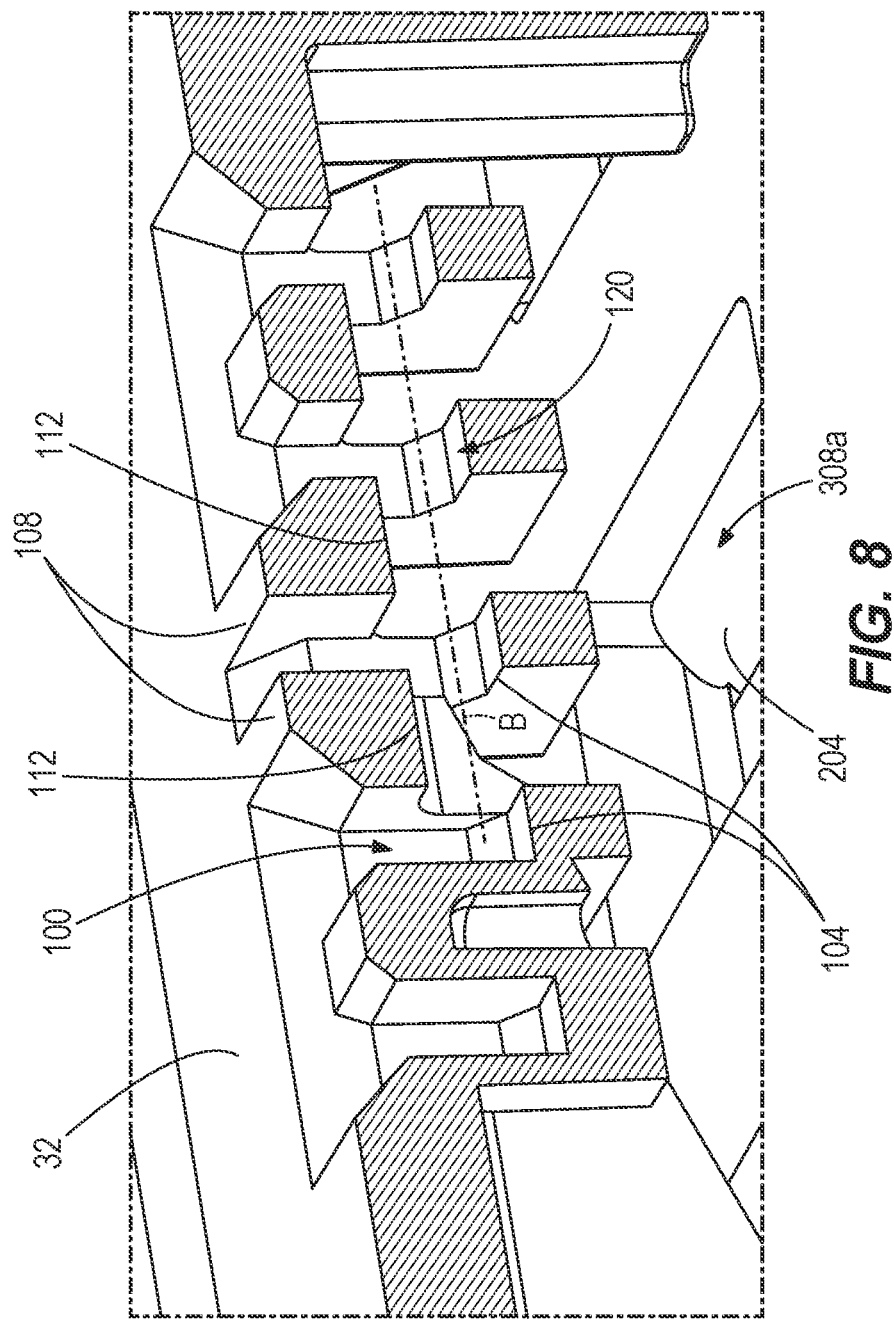
FIG. 8 is a detailed view of a portion of FIG. 7.
Figure 9:
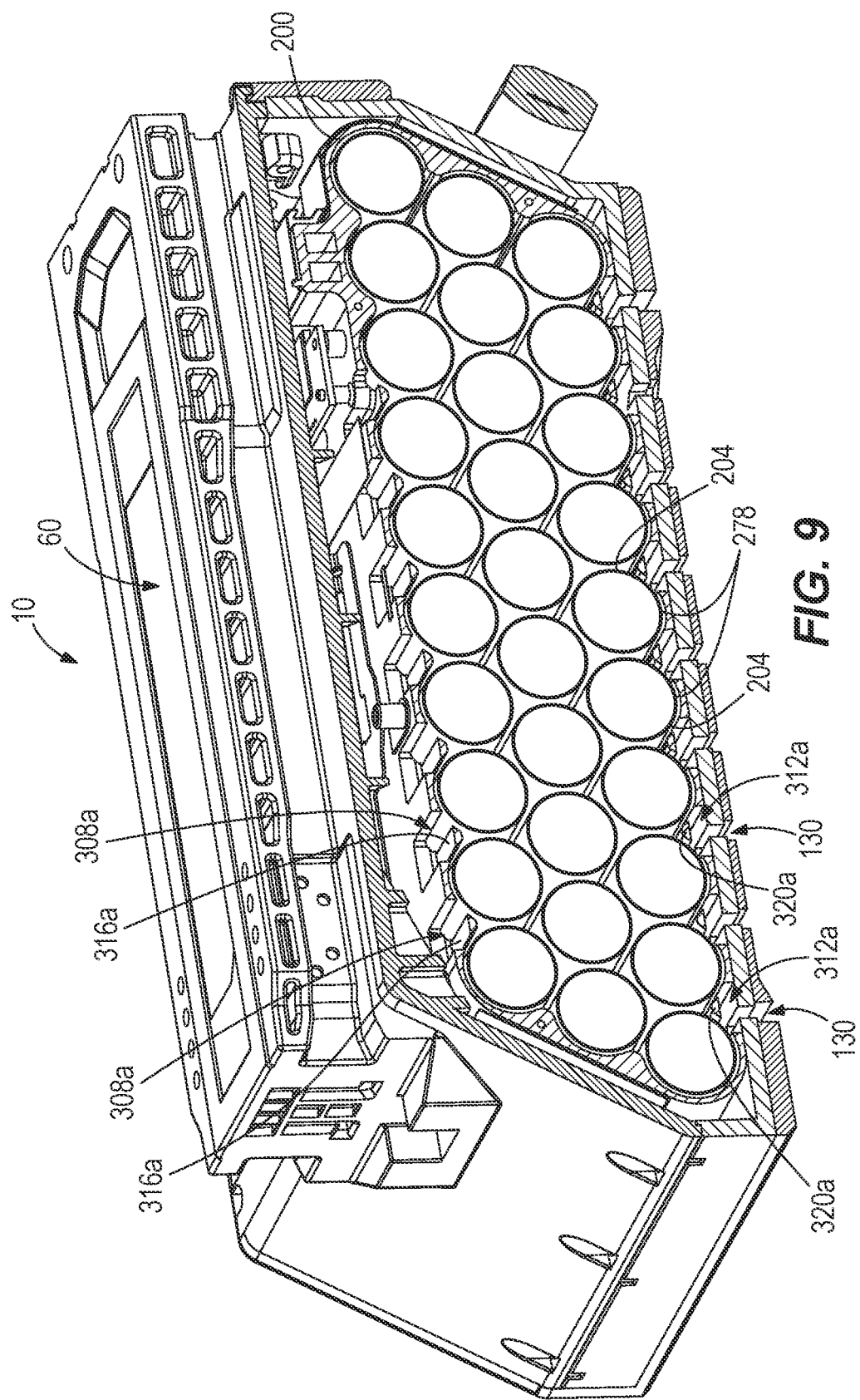
FIG. 9 is cross-sectional view of the battery pack of FIG. 1 along the line 9-9 of FIG. 1.

With respect to FIG. 4, the second wall 36 includes a second plurality of vents 130 that allow fluid communication between an exterior of the battery pack housing 20 and the interior of the battery pack housing 20. In the illustrated embodiment, each of the second plurality of vents 130 in the second wall 36 define an opening 134 that is oriented along an axis C that substantially perpendicular to the longitudinal axis A. Moreover, the openings 134 in the illustrated embodiment are longer in a width direction of the second wall 36 than in a length direction of the second wall 36. In other embodiments, the openings 134 may be longer in the length direction of the second wall 36 than in the width direction of the second wall 36. The orientation of the openings 134 may be determined by the orientation of the battery cells positioned within the battery pack housing 20, as will be discussed below. In the illustrated embodiment, a third plurality of vents 140 are positioned in both the second wall 36 and first sidewall 40. That is, each of the third plurality of vents 140 extends between the second wall 36 and the first sidewall 40. Similarly, a fourth plurality of vents 150 are positioned in both the second wall 36 and the second sidewall 44. That is, each of the fourth plurality of vents 150 extends between the second wall 36 and the second sidewall 44. Each of the third and fourth plurality of vents 140, 150 define openings 144, 154 with a first portion that is oriented along an axis D that perpendicular to the longitudinal axis A and a second portion that is oriented along an axis E that is perpendicular to the longitudinal axis A. The axis D of each of the first portions of the openings 144, 154 is perpendicular to the axis E of each of the second portion of the openings 144, 154. The protective member 88 has a plurality of openings 160, each accommodating one of the plurality of vents 130, 140, 150 in the second wall 36 and the sidewalls 40, 44 of the battery pack housing 20. In some embodiments, either or both of the third and fourth plurality of vents 140, 150 may be omitted.

With respect to FIGS. 1-5 and 7, the front wall 48 includes a fifth plurality of vents 170 that allow fluid communication between an exterior of the battery pack housing 20 and the interior of the battery pack housing 20. Each of the fifth plurality of vents 170 define an opening 174 with an axis F (FIG. 1) that extends parallel to the longitudinal axis A.

Figure 2B:
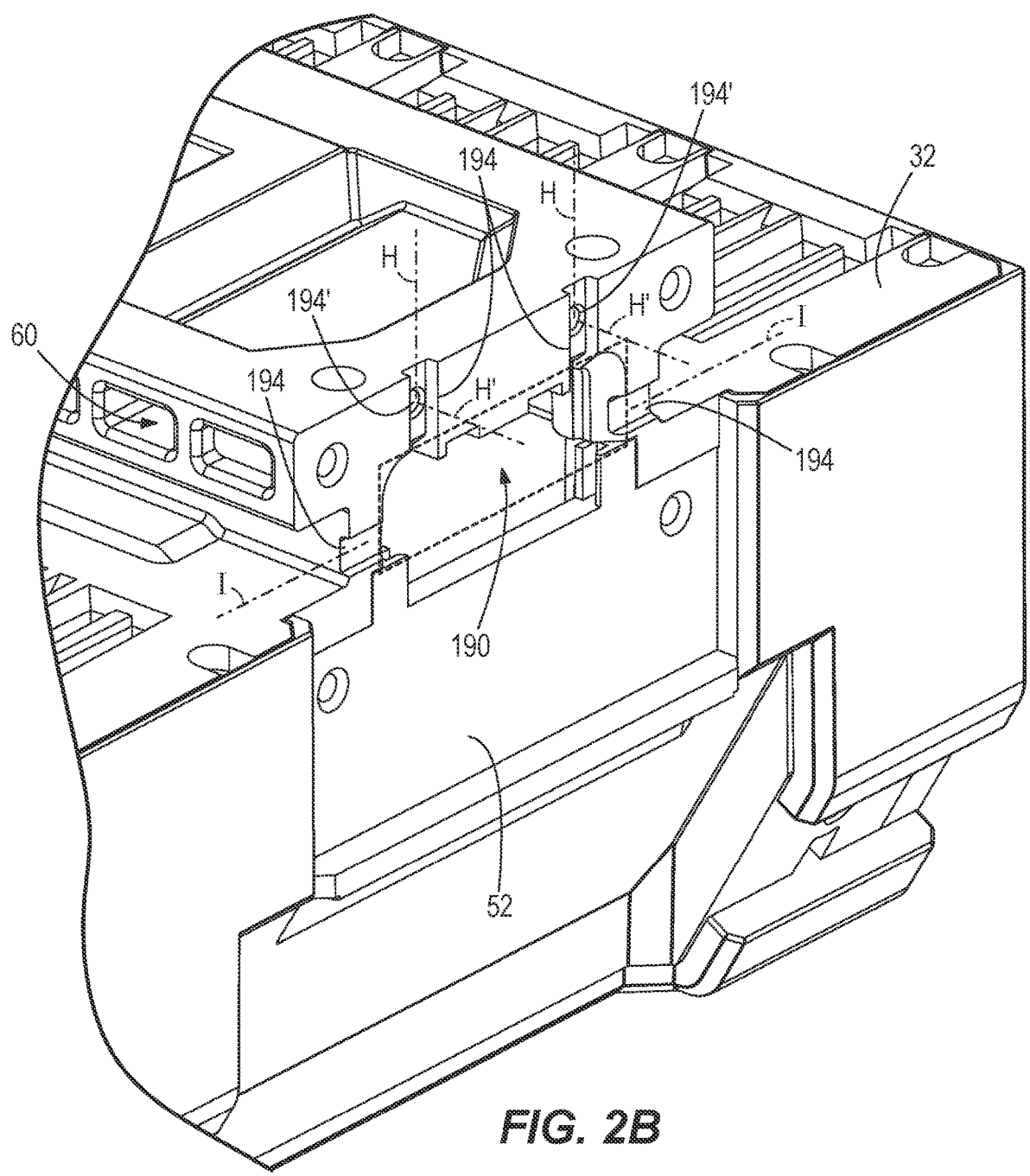
FIG. 2B is a detailed perspective view of a portion of the battery pack of FIG. 1.

In the embodiment illustrated in FIGS. 1-2B, the battery pack interface 60 includes a sixth plurality of vents 180a, 180b, 190 that allow fluid communication between an exterior of the battery pack housing 20 and the interior of the battery pack housing 20. In the illustrated embodiment, a first set of vents 180a, 180b of the sixth plurality of vents are positioned adjacent the front wall 48 and the plurality of terminal apertures 64. That is, in the illustrated embodiment, some of the sixth plurality of vents (e.g., the first set of vents 180a, 180b) of the battery pack interface 60 are positioned closer to the front wall 48 and the plurality of terminal apertures 64 than to the rear wall 52. Moreover, in the illustrated embodiment, a second set of vents 190 (FIG. 2B) of the sixth plurality of vents extend through the battery pack interface 60 adjacent the rear wall 52. That is, some of the sixth plurality of vents (e.g., the second set of vents 190) are positioned closer to the rear wall 52 than to the front wall 48.

In the illustrated embodiment, some of the first set of vents 180a of the sixth plurality of vents extends through each groove wall 84. In the illustrated embodiment, the first set of vents 180a (FIGS. 1, 2A, 5, 7) define openings 184a (FIG. 2A) that are oriented along an axis Ga (which is into the page as shown in FIG. 2A) that is perpendicular to the longitudinal axis A. The axes Ga of the first set of vents 180a are parallel to one another. Additionally, some of the first set of vents 180b of the sixth plurality of vents extends through a top surface of the battery pack interface 60. In the illustrated embodiment, some of the first set of vents 180b (FIGS. 2A, 5, 7) define openings 184b that are oriented along an axis Gb that is perpendicular to the longitudinal axis A. The axes Gb of the first set of vents 180b are parallel to one another. In the illustrated embodiment, the second set of vents 190 define openings 194 that are oriented along axes H, I that are perpendicular to the longitudinal axis A. The axes H, I of some of the second set of vents 190 are parallel to one another, and the axes H, I axes I of some of the second set of vents 190 are perpendicular to each other. As shown, two of the openings 194 are oriented along the axis H. A wall of the opening 194 includes an aperture 194' extending therethrough. The aperture 194' is in communication with the interior of the housing 20 and extends along an axis H' that is perpendicular to the axis H and parallel to the longitudinal axis A.

Figure 23:
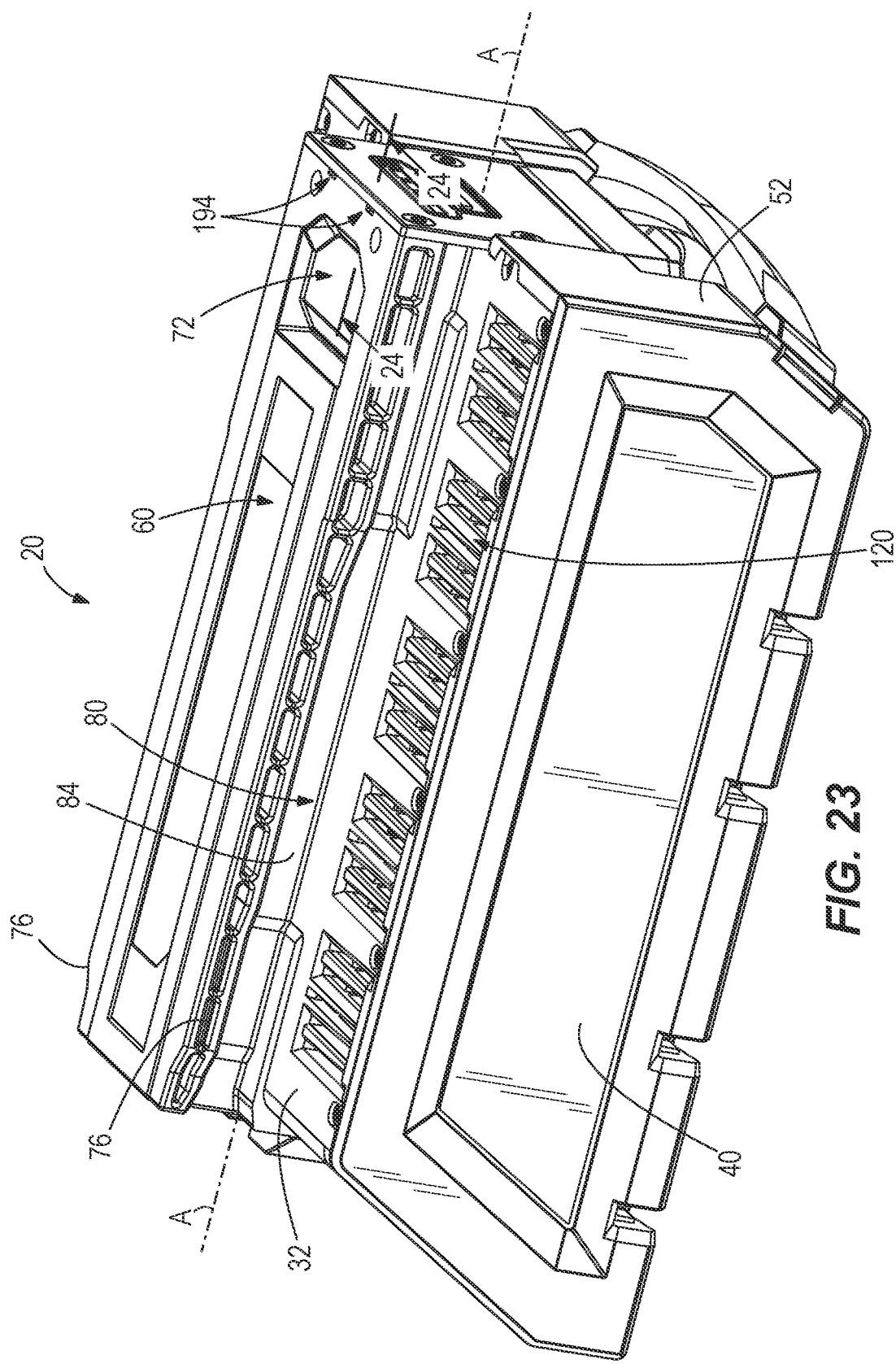
FIG. 23 is perspective view of a battery pack according to another construction.
Figure 24:
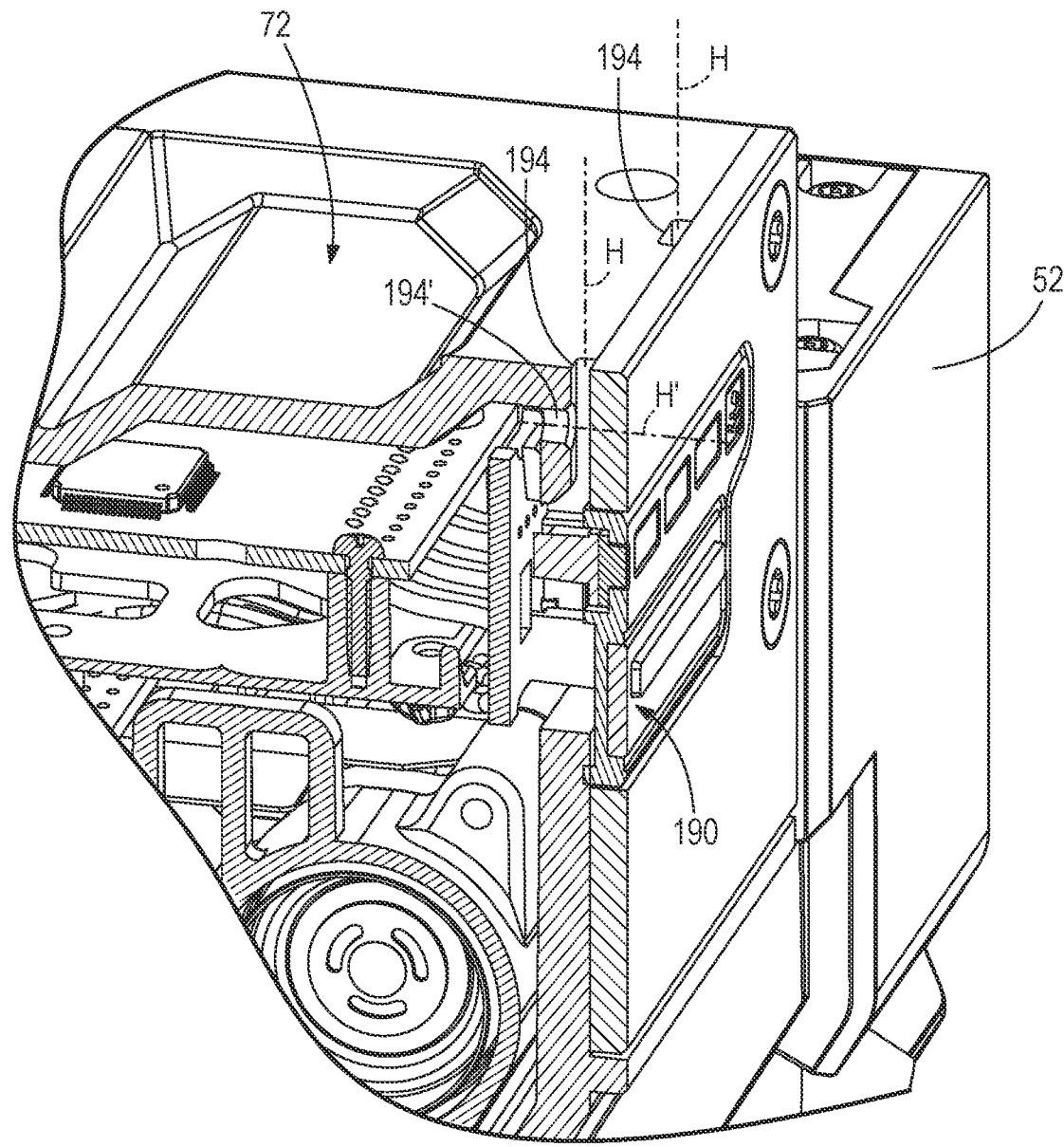
FIG. 24 is a detailed perspective view of a portion of the battery pack of FIG. 23.

In another embodiment, illustrated in FIGS. 23-24, the battery pack interface 60 may include a different vent structure. As shown in FIG. 23, the first set of vents 180, 180b are omitted. Additionally, as shown in FIG. 24, the openings 194 that are aligned along the I axis are omitted.

As noted above, the battery pack housing 20 has vents 120, 130, 140, 150, 170, 180a, 180b, 190 distributed throughout the walls thereof. The vents 120, 130, 140, 150, 170, 180a, 180b, 190 are molded with the battery pack housing 20. In other embodiments, the portions including the vents may be molded from a separate piece and coupled to the battery pack housing 20. The battery pack housing 20 defines a maximum surface area and encloses a maximum volume. In the illustrated embodiment, for example, the maximum surface area measures approximately 242650 mm$^2$ and the maximum volume measures approximately 3776350 mm$^3$. The first plurality of vents 120 in the first wall 32 define a first cumulative surface area. The second, third, and fourth plurality of vents 130, 140, 150 in the second wall 36 define a second cumulative surface area. The fifth and sixth plurality of vents 170, 180a, 180b, 190 in the battery pack interface 60 as well as the plurality of terminal apertures 64 define a third cumulative surface area. In the embodiment of FIG. 23, the fifth and sixth plurality of vents 170, 190 in the battery pack interface 60 as well as the plurality of terminal apertures 64 define the third cumulative surface area.

Generally, the various vents 120, 130, 140, 150, 170, 180a, 180b, 190 of FIG. 1 (and the various vents 120, 130, 140, 150, 170, 190 of FIG. 23) in the battery pack housing 20 increases the total airflow through the battery pack housing 20. In the illustrated embodiment, the first cumulative surface area of the first plurality of vents 120 is greater than the second cumulative surface area of the second plurality of vents 130. In other embodiments, the second cumulative surface area of the second plurality of vents 130 is greater than the first cumulative surface area of the first plurality of vents 120. In the illustrated embodiment, the first cumulative surface area measures about 4210 mm$^2$. That is, in the illustrated embodiment, the first cumulative surface area is approximately 2% of the maximum surface area. The term approximately, as used herein, means plus or minus 1%. In other embodiments, the first cumulative surface area may measure between 1% and 10% of the maximum surface area. In still other embodiments, the first cumulative surface area may measure between 1% and 50% of the maximum surface area. In the illustrated embodiment, the second cumulative surface area measures about 1130 mm$^2$. That is, in the illustrated embodiment, the second cumulative surface area is less than 1% (e.g., 0.4%) of the maximum surface area. In other embodiments, the second cumulative surface area may measure between 0% and 10% of the maximum surface area. In the illustrated embodiment, the third cumulative surface area measures about 275 mm$^2$. In other embodiments, the third surface may measure between 1% and 10% of the maximum surface area. That is, in the illustrated embodiment, the third cumulative surface area is less than 1% (e.g., 0.1%) of the maximum surface area. In other embodiments, the third cumulative surface area may measure between 1% and 10% of the maximum surface area. Accordingly, in the illustrated embodiment, the cumulative surface area resulting from the first and second cumulative surface areas measures about 5335 mm$^2$. That is, in the illustrated embodiment, is greater than 2% of the maximum surface area. In other embodiments, the cumulative surface area resulting from the first and second cumulative surface areas may measure from approximately 2% to 10% of the maximum surface area. Moreover, in the illustrated embodiment, the cumulative surface area resulting from the first, second, and third surface cumulative areas measures about 5610 mm$^2$. That is, in the illustrated embodiment, the cumulative surface area resulting from the first, second, and third cumulative surface areas is greater than 2% of the maximum surface area. In other embodiments, the cumulative surface area resulting from the first, second, and third cumulative surface areas may measure from approximately 2% to 10% of the maximum surface area. In still other embodiments, the cumulative surface area resulting from the first, second, and third cumulative surface areas may measure between 1% and 50% of the maximum surface area.

When the battery pack 10 is coupled to either the power tool or the charger, cooler air is pulled (e.g., sucked) into the interior of the battery pack housing 20 from the second portion 28 (e.g., bottom) of the battery pack 10 thereby cooling the internal components, discussed below, housed therein. In either case, the cooler air moves from an exterior of the battery pack 10 into the plurality of vents 130, 140, 150, 170 in the second portion 28 (e.g., the second, third, fourth, and fifth plurality of vents 130, 140, 150, 170) into the interior of the battery pack housing 20 and moves toward the plurality of vents 120, 180a, 180b, 190 (or plurality of vents 120, 190 in FIG. 23) in first portion of battery pack 10 (e.g., the first and sixth plurality of vents 120, 180a, 180b, 190 in FIG. 1 or the first and sixth plurality of vents 120, 190 in FIG. 23) and the plurality of terminal apertures 64. In some instances, the cooler air moves through the battery pack housing 10 by convection (e.g., when the battery pack 10 is coupled to the power tool). In other instances, the cooler air moves through the battery pack 10 via forced airflow, from a fan or blower (not shown), for example. In particular, for example, when the battery pack 10 is coupled to the power tool or the charger, one or more fans actively pulls or forces air into the battery pack housing 20. In some embodiments, for example, the charger may include mating rail/groove structures and one or more fans (e.g., two fans) positioned underneath or adjacent each rail. Each of the fans used for battery pack 10 cooling may move 31.64 CFM of an air in an unloaded condition. In the four-fan configuration, noted above, the maximum airflow through the pack may be as much as 126.6 CFM (63.3 CFM per each rail). The power tool to which the battery pack is attached may also include active cooling elements, such as fans.

In some embodiments, the air flow through the battery pack 10 may be less 126.6 CFM (63.3 CFM per each rail), depending, for example, on whether airflow enters and moves via convection and/or how many fans are used to move airflow. For example, in some embodiments, the air flow through the battery pack 10 may be 63.3 CFM. In another example, in some embodiments, the air flow through the battery pack 10 may be 31.64 CFM. In another example, in some embodiments, the air flow through the battery pack 10 may be up to 31.64 CFM. In another example, in some embodiments, the air flow through the battery pack 10 may be between 31.64 CFM and 63.3 CFM. In another example, in some embodiments, the air flow through the battery pack 10 may be between 63.3 CFM and 126.6 CFM. In another example, in some embodiments, the air flow through the battery pack 10 may be greater than 126.6 CFM.

Figure 13:
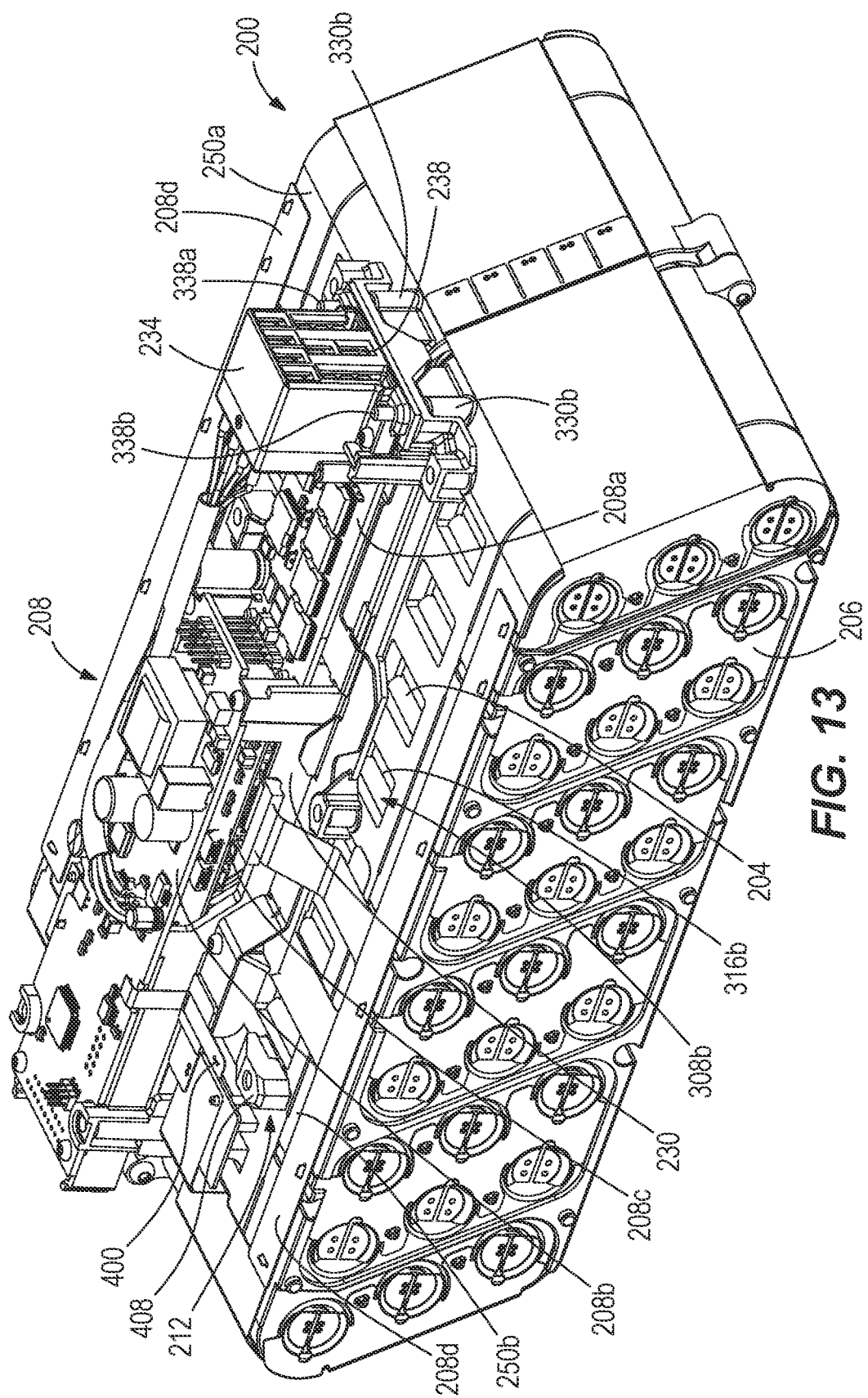
FIG. 13 is a perspective view of the battery pack of FIG. 1 with a housing of the battery pack removed and illustrating, among other features, a printed circuit board, a battery cell holder, and a terminal block.
Figure 14:
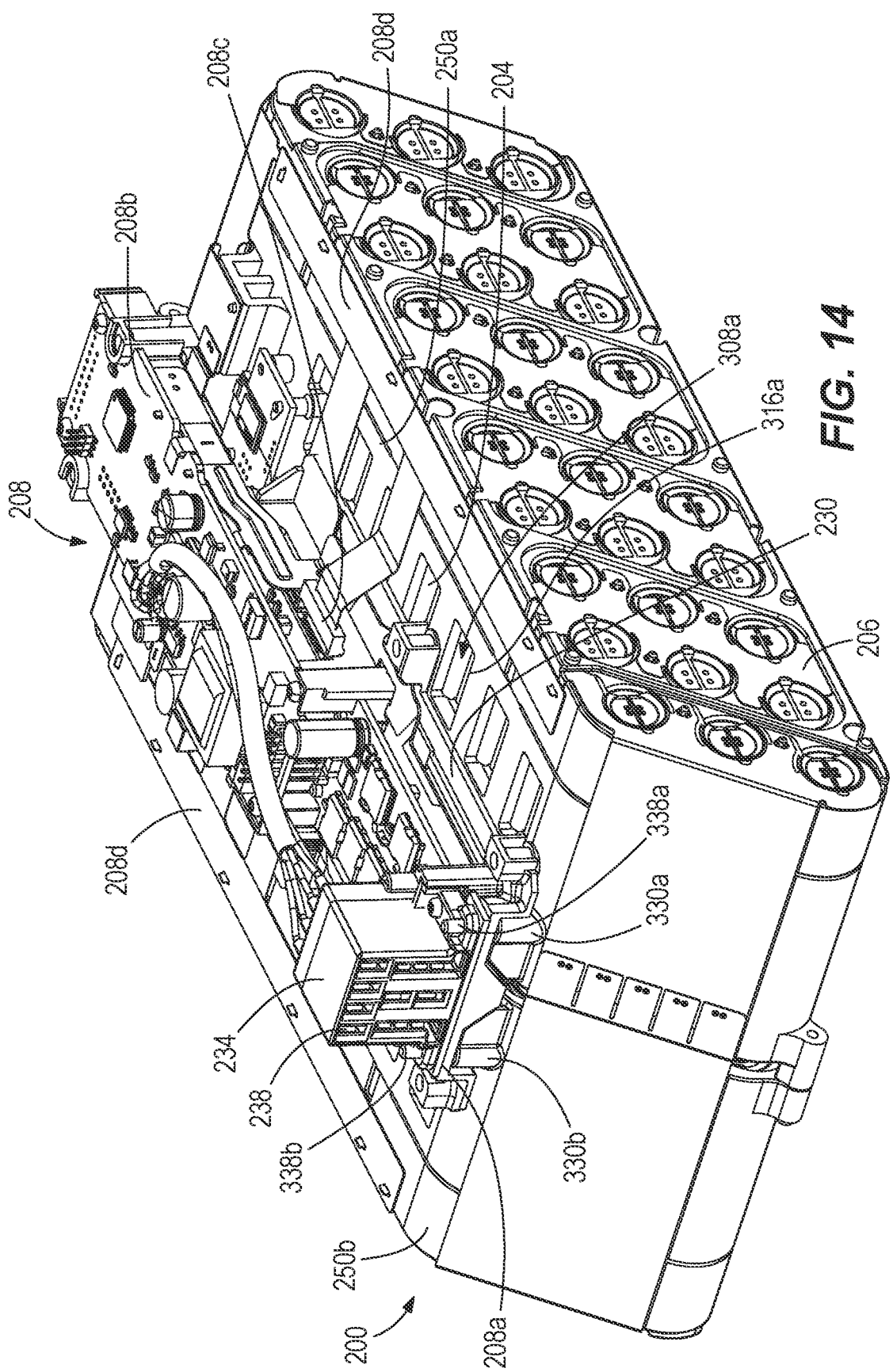
FIG. 14 is another perspective view of the battery pack of FIG. 1 with the housing of the battery pack removed and illustrating, among other features, the printed circuit board, the battery cell holder, and the terminal block.
Figure 15:
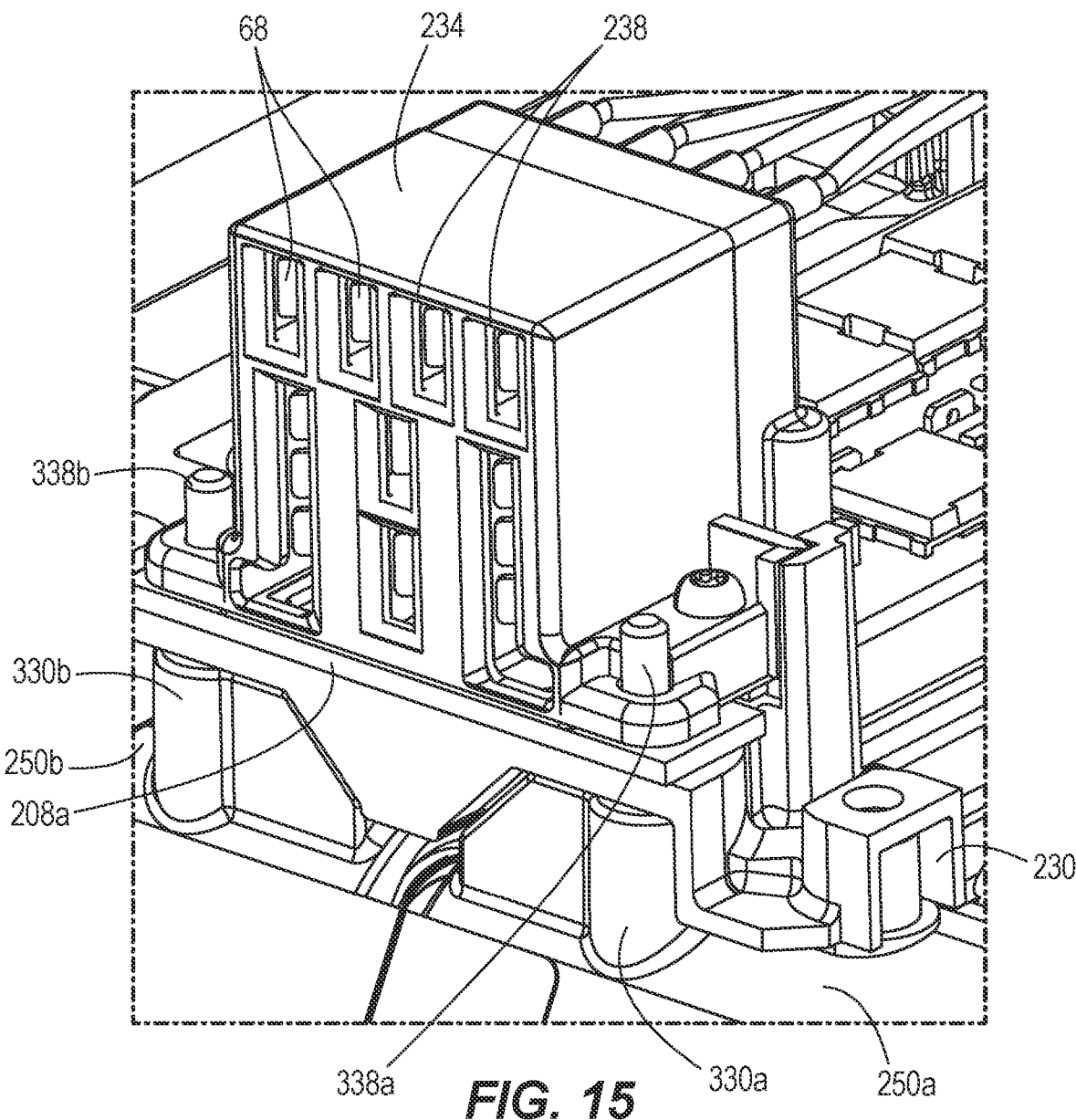
FIG. 15 is a detailed perspective view of the terminal block relative to the battery cell holder.
Figure 16:
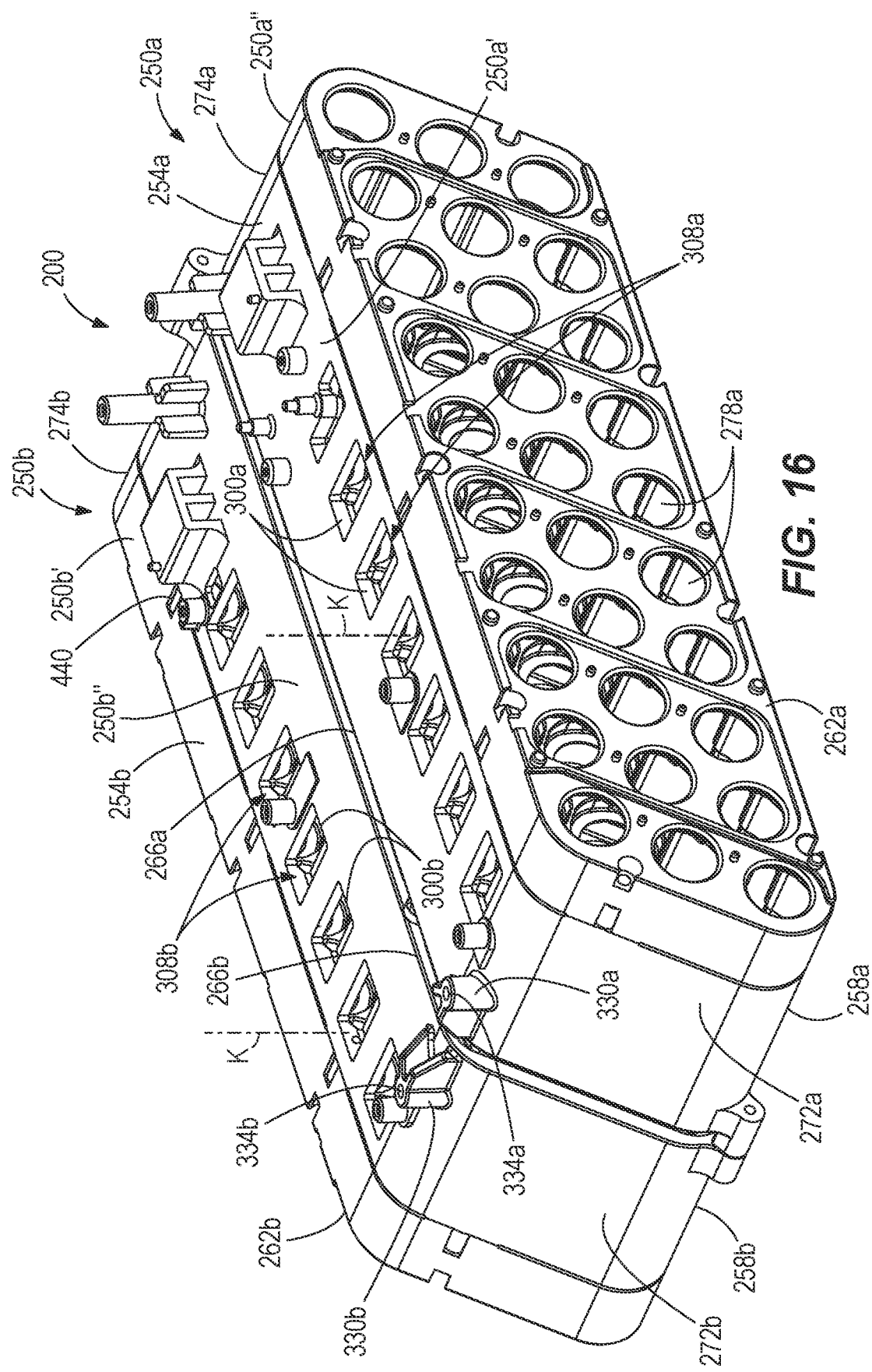
FIG. 16 is a perspective view of the battery cell holder.
Figure 17:
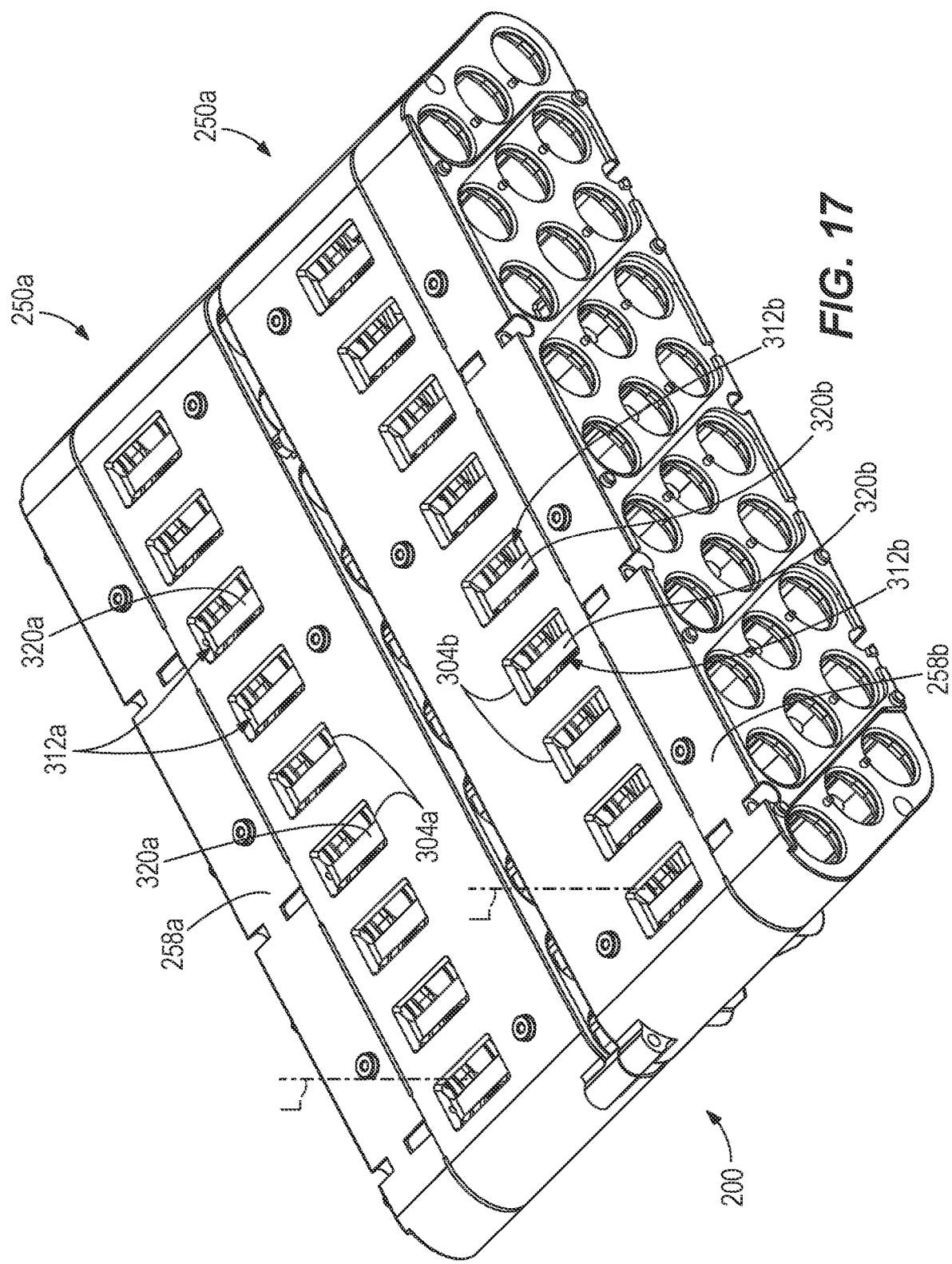
FIG. 17 is another perspective view of the battery cell holder.
Figure 18A:
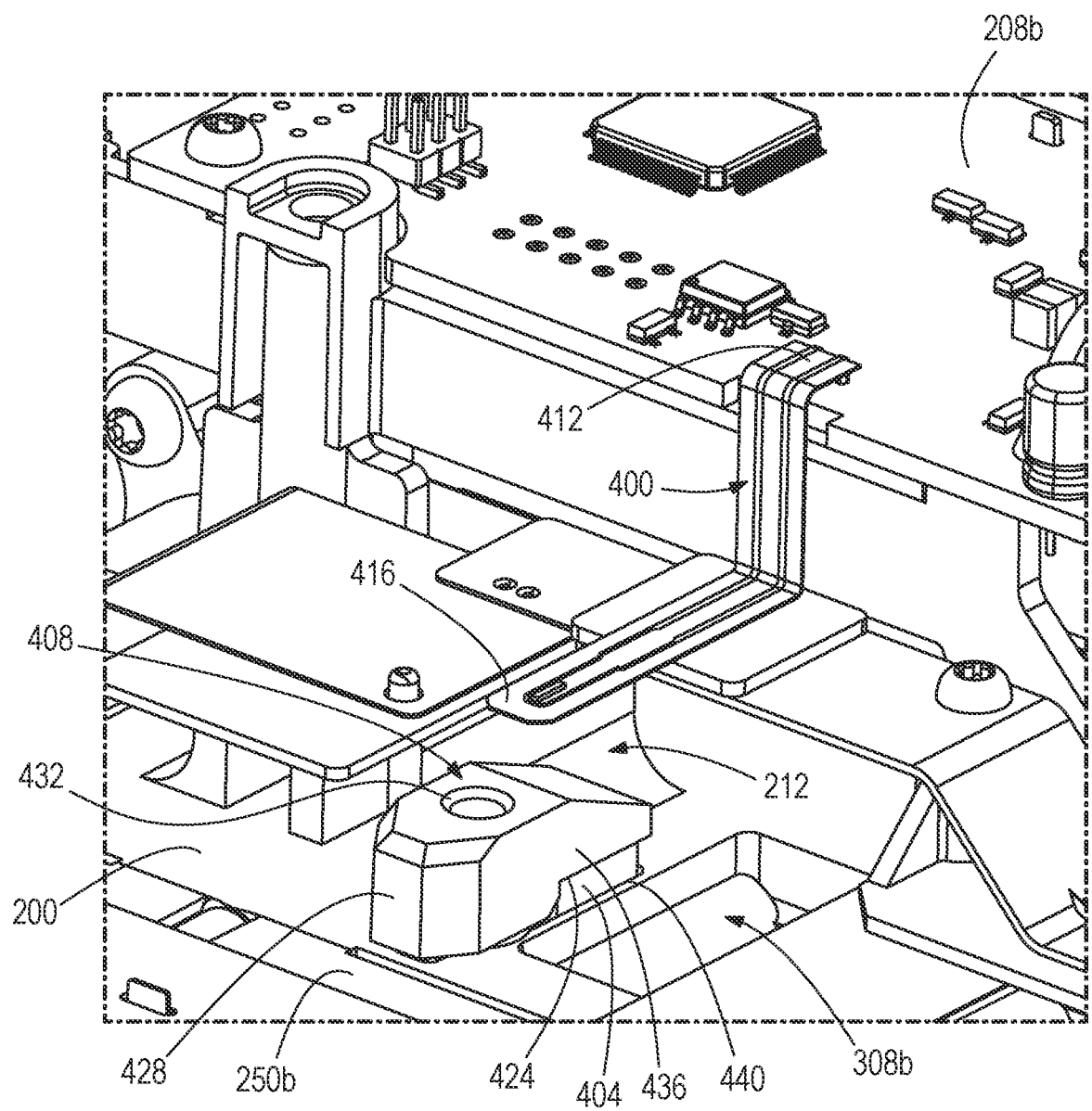
FIG. 18A is a detailed perspective view of a portion of the printed circuit board and a cell temperature measuring assembly including a clamp.
Figure 18B:
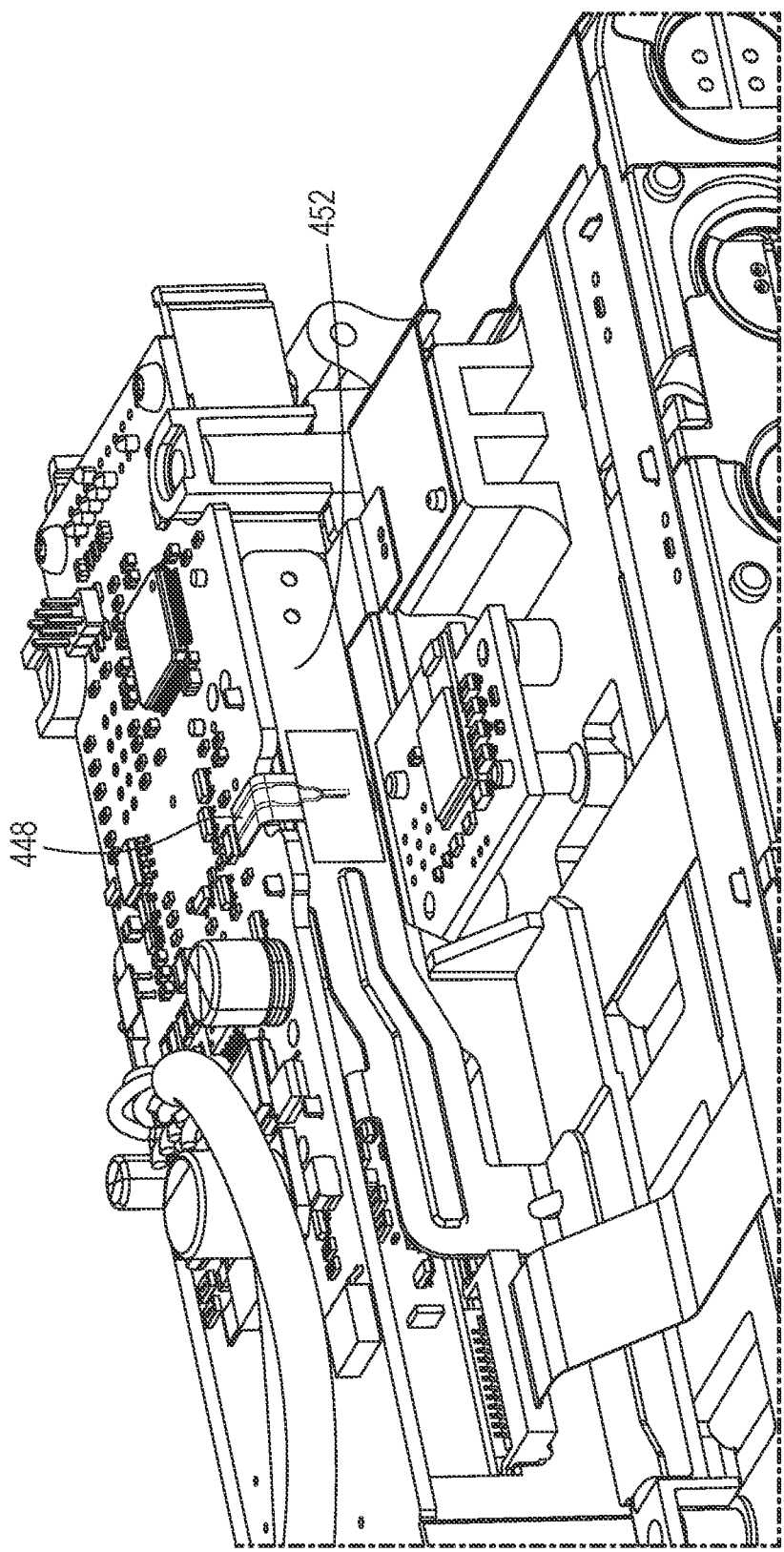
FIG. 18B is another detailed perspective view of the printed circuit board.

With respect to FIGS. 13-15, the battery pack housing 20 encloses, among other features, a battery cell holder 200, a plurality of battery cells 204 secured by the battery cell holder 200, cell straps 206 coupled to one or more battery cells 204 at the distal ends thereof, battery pack circuitry 208, the electrical terminals 68 (FIG. 15) in electrical communication with the battery pack circuitry 208, and a temperature measuring assembly 212 (e.g., a temperature sensing assembly) in electrical communication with the battery pack circuitry 208. The electrical terminals 68 are configured to mate with electrical terminals (not shown) of a power tool to provide power the power tool and electrical terminals (not shown) of a charger to recharge the battery cells 204.

Further with respect to FIGS. 13-15, in the illustrated embodiment, the battery pack circuitry 208 includes one or more printed circuit boards (PCBs). In the illustrated embodiment, the battery pack circuitry 208 includes a first PCB 208a, a second PCB 208b, and a third PCB 208c, and a fourth PCB 280d. The PCBs 208a-208c are physically coupled to a support member 230 (e.g., carrier), while fourth PCB 208d is coupled to the holder 200 and in communication with the battery cells 204 via the cell straps 206 and one or more of the PCBs 208a-208c. In the illustrated embodiment, the electrical terminals 68 are coupled to the first PCB 208a and are positioned adjacent one end of the first PCB 208a. Additionally, a terminal block 234 at least partially surrounds the electrical terminals 68. The terminal block 234 has a plurality of terminal apertures 238, one for each of the electrical terminals 68 to provide access thereto. The electrical terminals 68 and the terminal block 234 are at least partially positioned within the battery pack interface 60 adjacent the front wall 48 of the battery pack housing 20. The plurality of terminal apertures 238 of the terminal block 234 are adjacent the plurality of terminal apertures 64 in the battery pack interface 60. That is, each of the plurality of terminal apertures 238 of the terminal block 234 has a similar size and shape to one of the plurality of terminal apertures 64 in the battery pack interface 60. Moreover, each of the plurality of terminal apertures 238 of the terminal block 234 is aligned with the respective one of the plurality of terminal apertures 64 in the battery pack interface 60. A gasket or seal member (not shown) may be positioned between the battery pack interface 60 and the terminal block 234.

As shown in FIGS. 9-10 and 16-17, the battery cell holder 200 includes a first portion 250a and a second portion 250b that couples to the first portion 250a. Although only the first portion 250a is discussed in detail, it should be understood that the second portion 250b includes all of the same elements as the first portion 250a. The first portion 250a includes a first wall 254a, a second wall 258a opposite the first wall 254a, a first sidewall 262a, a second sidewall 266a, third sidewall 270a, and fourth third sidewall 274a. The sidewalls 262a, 266a, 270a, 274a extend between the first and second walls 254a, 258a. The first wall 254a is positioned adjacent the first wall 32 of the battery pack housing 20, the second wall 258a is positioned adjacent the second wall 36 of the battery pack housing 20, the first sidewall 262a is positioned adjacent one of the first and second sidewalls 40, 44 of the battery pack housing 20, the second sidewall 266a is positioned adjacent the second portion of the battery cell holder 200, the third sidewall 270a is positioned adjacent the front wall 48 of the battery pack housing 20, and the fourth sidewall 274a is positioned adjacent the rear wall 52 of the battery pack housing 20. A plurality of battery cell receiving sections 278a extend from the first sidewall 262a to the second sidewall 266a. Accordingly, an axis J of the battery cells 204 is oriented perpendicular to the longitudinal axis A of the battery pack 10. Accordingly, as noted above, the openings 134 of the second plurality of vents 130 are longer in the width direction of the second wall 36 than in the length direction of the second wall 36. That is, a length of the openings 134 are parallel to the axes J of the battery cells 204. In the illustrated embodiment, the first portion 250a is not integrally formed. Rather, in the illustrated embodiment, the first portion 250a includes a central portion 250a' and a peripheral portion 250a" that is coupled to the central portion 250a' via fasteners or the like. Accordingly, in the illustrated embodiment, when the battery cells 204 are received in the battery cell holder 200 the battery cells are axially compressed by the first and second portions 250, 250b. In other embodiments, the first portion 250a may be integrally formed as single piece. In still other embodiments, the entire battery cell holder 200 may be integrally formed as a single piece.

Figure 10:
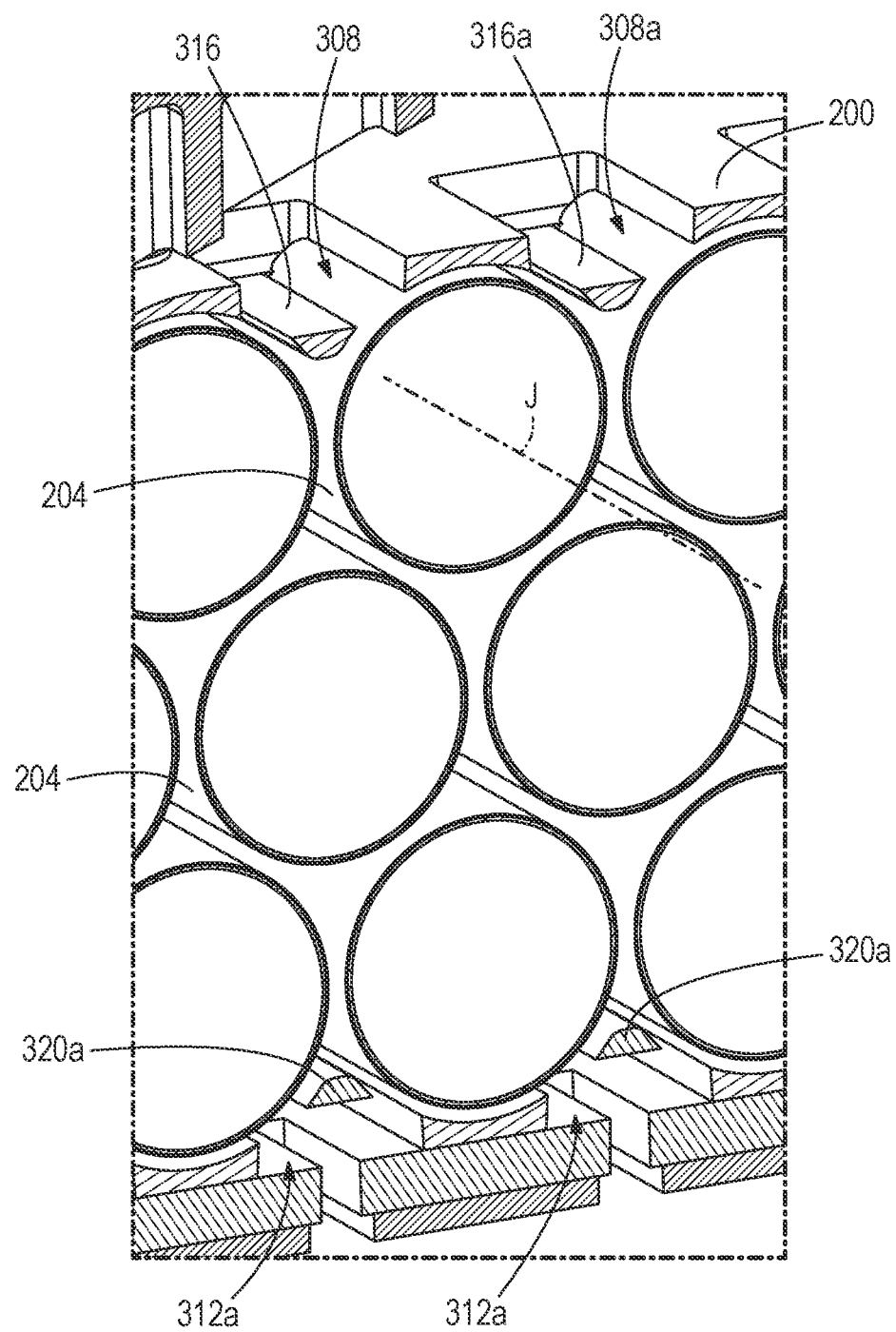
FIG. 10 is a detailed view of a portion of FIG. 9.
Figure 11:
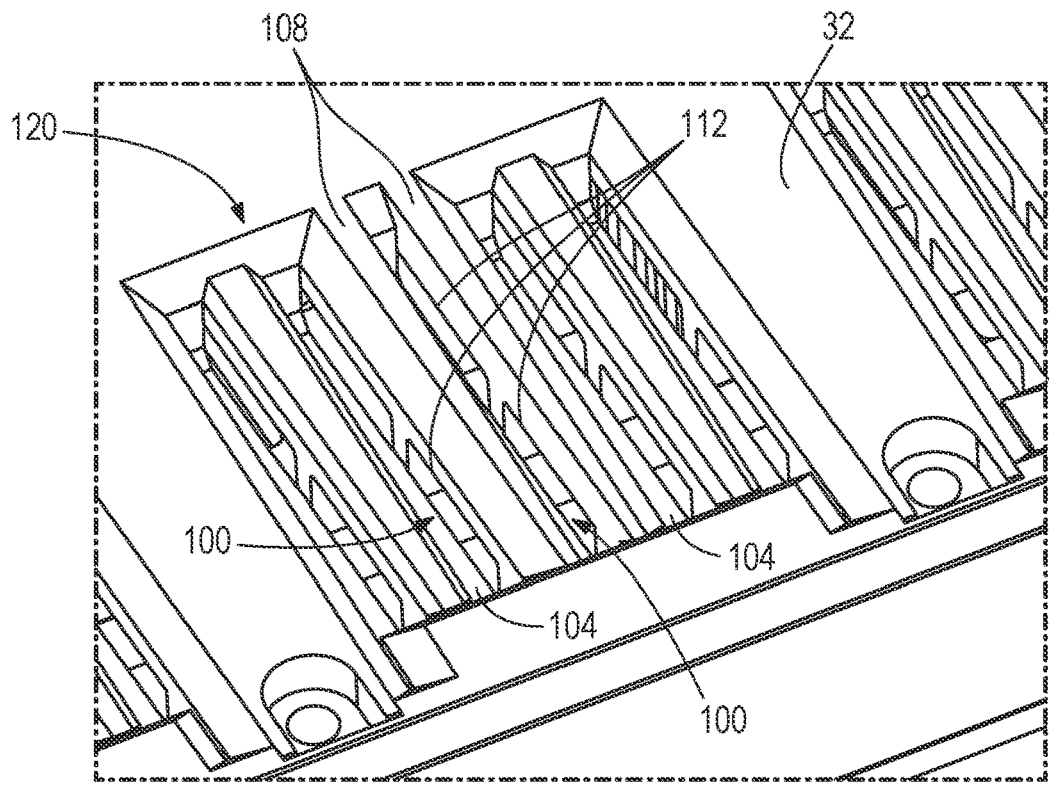
FIG. 11 is a detailed view of a portion of FIG. 1.
Figure 12:
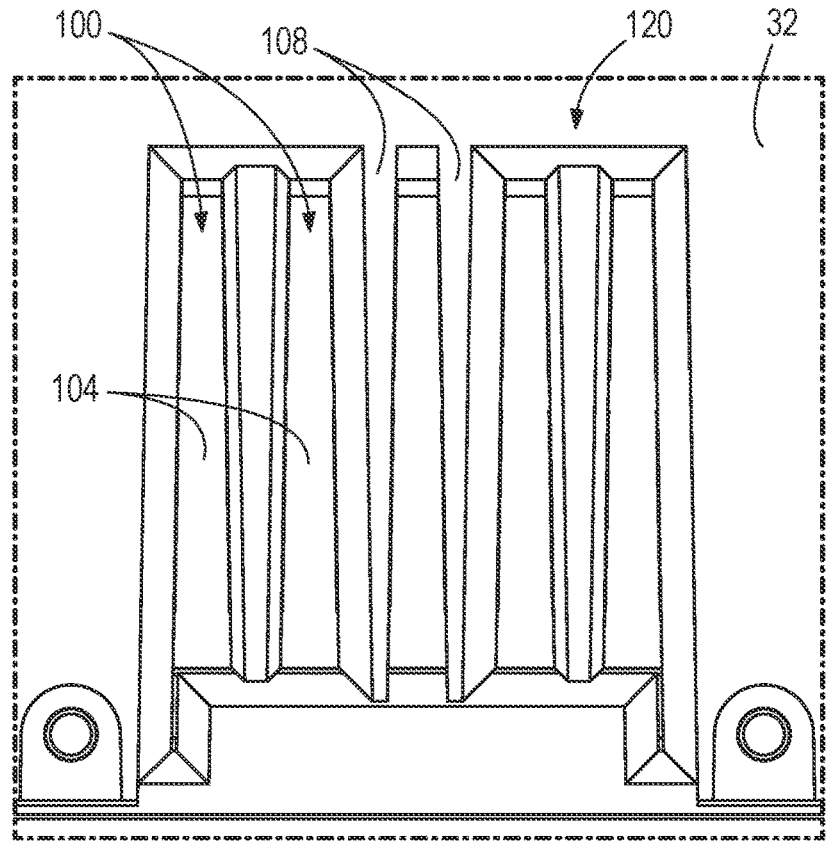
FIG. 12 is a detailed view of a portion of FIG. 1.

Further with respect to FIGS. 9-10 and 16-17, the first wall 254a of the battery cell holder 200 includes a plurality of openings 300a and the second wall 258a of the battery cell holder 200 includes a plurality of openings 304a. Each of the plurality of openings 300a, 304a are oriented along an axis K, L that is perpendicular to both the longitudinal axis A and the axes J of the battery cells 204. The plurality of openings 300a, 304a in the first and second walls 254a, 258a define a plurality of battery cell holder vents 308a, 312a that allow fluid communication between an area between the battery cell holder 200 and the battery pack housing 20 and an area within the battery cell holder 200. Each of the plurality of battery holder vents 308a, 312a in the first wall 254a of the battery cell holder 200 are positioned adjacent one or more of the first plurality of vents 120 of the battery pack housing 20. Similarly, each of the plurality of vents 312a in the second wall 258a of the battery cell holder 200 are positioned adjacent one or more of the second plurality of vents 130 of the battery pack housing 20. In the illustrated embodiment, an air flow guide member 316a, 320a (e.g., a louvre) extends across the opening of each of the plurality of openings 308a, 312a in the first and second walls 254a, 258a. Each louvre 316a, 320a is recessed from the respective wall 254, 258 such that it is positioned within the battery cell holder 200. As shown in FIG. 10, each of the louvers 316a, 320a at least partially defines a battery cell receiving section 278a. Like the louvres 104, 108 (FIGS. 6, 8) of the battery pack housing 20, the louvers 316a, 320a of the battery cell holder 200 direct airflow that enters the vents 308a, 312a in the battery pack holder 200 and around the battery cells 204 and create a labyrinth for fluid ingress protection. In some embodiments, the air flow guide members 315a, 3120a may be omitted (e.g., when the openings 308a, 312a in the battery cell holder 200 are less than 1 mm wide).

With respect to FIGS. 13-16, the battery cell holder 200 is configured to support the battery pack circuitry 208. As shown, the carrier 230, which supports at least some of the PCBs, is positioned on and supported by the battery cell holder 200. The battery cell holder 200 further includes a post or projection 330a, 330b extending from the first wall 254a, 254b of each of the first and second portions 250a, 250b of the battery cell holder 200. Each of the posts 254a, 254b defines an aperture 334a, 334b extending therethrough. A pin 338a, 338b is positioned and secured in each of the apertures 334a, 334b and extends from the respective post 330a, 330b. In the illustrated embodiment, each of the pins 338a, 338b is metal and is insert molded with the respective post 330a, 330b. In other embodiments, each of the pins 338a, 338b may be inserted into the aperture 334a, 334b of the respective post 330a, 330b after it is molded by any suitable means (e.g., press-fit, threadably coupled, etc.). The pin 338a, 338b of each post is configured to be received by respective aligned apertures in carrier 230, the first PCB 208a, and the terminal block 234 to appropriately position the battery pack circuitry 208 relative to the battery cell holder 200.

With respect to FIGS. 18-22D, the temperature measuring assembly 212 is supported, at least in part, by the battery cell holder 200. The temperature measuring assembly 212 includes a temperature sensor 400 (e.g., a thermistor), pressing member 404, and a clamp 408. As shown, the thermistor 400 includes a first end 412 that is electrically coupled to the battery pack circuitry 208 (e.g., the second PCB) and a second end 416 that is configured to directly contact one of the battery cells 204. The pressing member 404 is a foam pad in the illustrated embodiment but may be constructed from any suitable material. The pressing member 404 includes a first surface 420 and a second surface 424. The clamp 408 includes a body 428 that has an aperture 432 extending therethrough and an arm 436 extending from the body 428.

As shown in FIGS. 22A-22D, to assemble the temperature measuring assembly 212, the first end 412 of the thermistor 400 is coupled to the battery pack circuitry 208 (e.g., the second PCB 208b). The second end 416 of the thermistor 400 is coupled (e.g., by an adhesive) to the first surface 420 of the pressing member 404. The thermistor 400 and the first surface 420 of the pressing member 404 are inserted into an aperture 440 in the battery cell holder 200 such that the second end 416 of the thermistor 400 contacts one of the battery cells 204. In the illustrated embodiment, the aperture 440 extends through the first wall 254 of the second portion 250 of the battery cell holder 200. In other embodiments, the aperture 440 may be positioned elsewhere. The pressing member 404 is positioned within the aperture 440 such that the pressing member 404 protrudes from the battery cell holder 200. The clamp 408 is then secured to the battery cell holder 200 adjacent the aperture 440 such that the clamp 408 exerts a pressing force in the direction of arrow Z on the pressing member 404. In particular, the body 428 of the clamp 408 is secured (e.g., by a fastener 444 received through the aperture 232 in the body 428) to the battery cell holder 200 such that the arm 436 is positioned to contact and exert a pressing force on the second surface 424 of the pressing member 404. The pressure applied to the thermistor 400 via the pressing member 400 and the clamp 428 ensures good contact with a surface of the battery cell 204, and therefore the thermistor 400 is able to more accurately sense and measure the temperature of the battery cell 204. Moreover, the fact that the thermistor 400 is positioned to contact a battery cell 204 in the top row near a top of the battery pack 10 (e.g., adjacent the battery pack interface 60) allows for more accurate reading because the cooler air pulled into the battery pack housing 20 comes from the second portion 28 of the battery pack 10, as discussed above. In the illustrated embodiment, only a single thermistor 400 is needed for the battery cells 204. In some embodiments, like the one shown, an additional thermistor 448 may be coupled to the sense resistor 452. In the illustrated embodiment, the thermistor 448 is positioned on an opposite side of the battery pack circuitry 208 from the thermistor 400.

Although the disclosure has been described with reference to certain preferred aspects, variations and modifications exist within the scope and spirit of one or more independent aspects of the disclosure as described. Various features and advantages of the disclosure are set forth in the following claims.

What is claimed is:

1. A battery pack comprising:
a housing having a first portion and a second portion coupled to the first portion, the first portion having a first wall and an interface extending from the first wall, the interface including a plurality of terminal apertures that provide access to electrical terminals within the housing, the second portion having a second wall, the second wall being positioned opposite the first wall;
a first plurality of vents extending through the first wall; and
a second plurality of vents extending through the second wall;
wherein a cumulative surface area of the first plurality of vents is different than a cumulative surface area of the second plurality of vents.

2. The battery pack of claim 1, wherein a sum of the cumulative surface area of the first plurality of vents and the cumulative surface area of the second plurality of vents is greater than two percent of a total surface area of the housing.

3. The battery pack of claim 1, wherein the cumulative surface area of the first plurality of vents is at least two percent of a total surface area of the housing.

4. The battery pack of claim 1, wherein the first plurality of vents includes one or more louvres that direct airflow into the housing and prevent the ingress of fluid and solid obstructions into the housing.

5. The battery pack of claim 1, wherein the interface further includes a pair of rails and a pair of grooves, each of the pair of rails being spaced apart from the first wall and each of the pair of grooves at least partially defined between one of the rails and the first wall and a groove wall extending between the respective one of the rails and the first wall, the interface further including a plurality of vents extending through the each of the groove walls and a plurality of vents positioned opposite the plurality of terminal apertures.

6. The battery pack of claim 1, wherein the interface further includes a pair of rails and a pair of grooves, each of the pair of rails being spaced apart from the first wall and each of the pair of grooves at least partially defined between one of the rails and the first wall and a groove wall extending between the respective one of the rails and the first wall, the interface further including a plurality of vents positioned opposite the plurality of terminal apertures.

7. The battery pack of claim 6, wherein a cumulative surface area defined by each of the plurality of vents in the first wall, the second wall, and the interface and the plurality of terminal apertures is greater than two percent of a total surface area of the housing.

8. The battery pack of claim 1, further comprising a battery cell holder enclosed within the housing and configured to receive and secure a plurality of battery cells, the battery cell holder including a first wall and a second wall opposite the first wall, the first wall including a first plurality of vents and the second wall including a second plurality of vents, each of the first plurality of vents of the battery cell holder positioned adjacent to one or more of the first plurality of vents in the first wall of the housing, each of the second plurality of vents of the battery cell holder positioned adjacent to one or more of the second plurality of vents in the second wall of the housing.

9. The battery pack of claim 8, wherein each of the battery cells is axially compressed within the battery cell holder.

10. The battery pack of claim 8, wherein each of the first and second plurality of vents in the battery cell holder includes a louver that directs airflow relative to the housing and prevents the ingress of fluid and solid obstructions into the housing.

11. The battery pack of claim 8, further comprising a printed circuit board supported by the battery cell holder, the battery cell holder including at least one pin that receives an aperture of the printed circuit board.

12. The battery pack of claim 11, further comprising a terminal block at least partially positioned within the interface and at least partially surrounding the electrical terminals, the terminal block including a plurality of terminal apertures configured to align with the plurality of terminal apertures in the interface, the terminal block further including at least one aperture configured to align with the aperture in the printed circuit board and configured to receive the at least one pin therethrough.

13. A battery pack comprising:
a housing including an interface;
a battery cell holder enclosed within the housing, the battery cell holder configured to receive and secure a plurality of battery cells, the battery cell holder including an aperture extending therethrough and providing access to at least one of the plurality of battery cells;
battery pack circuitry supported by the battery cell holder;
a temperature measuring assembly supported by the battery cell holder and in electrical communication with the battery pack circuitry to measure the temperature of the at least one of the plurality of battery cells, the temperature measuring assembly including
a sensor having a first end in electrical communication with the battery pack circuitry and a second end extending through the aperture in the battery cell holder, the second end configured to directly contact the at least one of the plurality of battery cells,
a pressing member at least partially positioned with the aperture and configured to press the second end of the sensor against the at least one of the plurality of battery cells, and
a clamp secured to the battery cell holder and configured to secure the pressing member relative to the battery cell holder such that the pressing member forces the second end of the sensor to maintain contact with the at least one of the plurality of battery cells.

14. The battery pack of claim 13, wherein the battery pack circuitry is secured to a support member that is supported by the battery cell holder, and wherein the battery cell holder includes at least one pin that receives an aperture of the support member.

15. The battery pack of claim 13, wherein the battery cell holder includes a plurality of vents, each of the plurality of vents of the battery cell holder positioned adjacent to one or more of a plurality of vents in the housing.

16. The battery pack of claim 14, wherein each of the plurality of vents in the battery cell holder includes a louver that directs airflow, and wherein each of the plurality of vents in the housing includes a louver that directs airflow.

17. The battery pack of claim 13, wherein the temperature measuring assembly is positioned adjacent the interface.

18. A battery pack comprising:
a housing having a first portion and a second portion coupled to the first portion, the first portion having a first wall and an interface extending from the first wall, the interface including a plurality of terminal apertures that provide access to electrical terminals within the housing, the second portion having a second wall, the second wall being positioned opposite the first wall,
a first plurality of housing vents extending through the first wall,
a second plurality of housing vents extending through the second wall,
a battery cell holder enclosed within the housing and configured to receive and secure a plurality of battery cells, the battery cell holder including a first wall and a second wall opposite the first wall, the first wall of the battery cell holder positioned adjacent the first wall of the housing and the second wall of the battery cell holder positioned adjacent the second wall of the housing, at least one of the first wall and the second wall of the battery cell holder including a plurality of battery cell holder vents positioned adjacent to one or more of the respective first plurality of housing vents or second plurality of housing vents.

19. The battery pack of claim 18, wherein the plurality of battery cell holder vents is a first plurality of battery cell holder vents extending through the first wall of the battery cell holder and positioned adjacent to the first plurality of housing vents, and further comprising a second plurality of battery cell holder vents extending through the second wall of the battery cell holder and positioned adjacent to the second plurality of housing vents.

20. The battery pack of claim 18, wherein at least a portion of the first plurality of housing vents includes louvres and a portion of the plurality of battery cell holder vents includes louvers.

21. The battery pack of claim 18, further comprising
a printed circuit board supported by the battery cell holder;

a temperature measuring assembly supported by the battery cell holder and in electrical communication with the printed circuit board to measure the temperature of the at least one of the plurality of battery cells, the temperature measuring assembly including
- a sensor having a first end coupled to the printed circuit board and a second end extending through the aperture in the battery cell holder, the second end configured to directly contact the at least one of the plurality of battery cells,
- a pressing member positioned at least partially positioned with the aperture and configured to press the second end of the sensor against the at least one of the plurality of battery cells, and
- a clamp secured to the battery cell holder and configured to secure the pressing member relative to the battery cell holder such that the pressing member forces the second end of the sensor to maintain contact with the at least one of the plurality of battery cells.

* * * * *